(12) United States Patent
Blanding et al.

(10) Patent No.: US 7,834,494 B2
(45) Date of Patent: Nov. 16, 2010

(54) FAULT-TOLERANT ELECTROMECHANICAL ACTUATOR HAVING A TORQUE SENSING CONTROL SYSTEM

(75) Inventors: David E Blanding, Hawthorne, CA (US); Jim Peck, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 850 days.

(21) Appl. No.: 11/291,709

(22) Filed: Dec. 1, 2005

(65) Prior Publication Data

US 2006/0113933 A1 Jun. 1, 2006

Related U.S. Application Data

(63) Continuation-in-part of application No. 10/860,931, filed on Jun. 4, 2004, now Pat. No. 7,190,096.

(51) Int. Cl.
*H02K 16/00* (2006.01)
*H02K 7/10* (2006.01)

(52) U.S. Cl. ................ 310/68 B; 310/83; 310/112; 310/80; 74/89.26; 318/432

(58) Field of Classification Search .......... 310/80, 310/112, 114, 83; 74/89.26–89.29, 89.34, 74/424.91, 424.92, 424.78, 424.86, 490.03; 318/116, 432
See application file for complete search history.

(56) References Cited

U.S. PATENT DOCUMENTS

| | | | |
|---|---|---|---|
| 2,321,442 A | 6/1943 | Wilson | |
| 4,607,180 A * | 8/1986 | Stoody | 310/80 |
| 4,637,272 A * | 1/1987 | Teske et al. | 74/89.26 |
| 4,673,859 A * | 6/1987 | Shero et al. | 318/810 |
| 4,858,491 A * | 8/1989 | Shube | 74/665 B |
| 4,888,541 A * | 12/1989 | Russell | 318/696 |
| 5,092,539 A | 3/1992 | Caero | |
| 6,394,218 B1 * | 5/2002 | Heitzer | 180/402 |
| 6,446,519 B1 | 9/2002 | Biester | |
| 6,453,761 B1 | 9/2002 | Babinski | |
| 6,505,132 B1 | 1/2003 | Takaku | |
| 6,531,798 B1 | 3/2003 | Palmero | |
| 6,791,215 B2 * | 9/2004 | Tesar | 310/12 |
| 6,843,239 B2 * | 1/2005 | Fensom et al. | 123/568.21 |
| 7,122,926 B2 * | 10/2006 | Tesar | 310/75 R |
| 7,190,096 B2 * | 3/2007 | Blanding et al. | 310/112 |
| 2004/0007923 A1 | 1/2004 | Tesar | |
| 2005/0269887 A1 * | 12/2005 | Blanding et al. | 310/112 |
| 2006/0113933 A1 * | 6/2006 | Blanding et al. | 318/116 |

FOREIGN PATENT DOCUMENTS

WO  WO 2004/027266  4/2004

* cited by examiner

*Primary Examiner*—Karl I Tamai
(74) *Attorney, Agent, or Firm*—Harness, Dickey & Pierce, P.L.C.

(57) ABSTRACT

An electromechanical actuator (EMA) is provided. The EMA includes a threaded output ram connectable to a mechanical component and at least one motor module engageable with the output ram for controllably translating the output ram along a linear axis of the output ram. The actuator further includes a torque sensing adaptive control (TSAC) system for monitoring torque within the motor module. The TSAC generates a disengagement command signal when the TSAC system determines torque within the motor module is outside an allowable motor module torque range. The disengagement command signal initiates disengagement of the motor module from the output ram.

13 Claims, 25 Drawing Sheets

FAULT-TOLERANT ELECTROMECHANICAL ACTUATOR HAVING A TORQUE SENSING CONTROL SYSTEM

CROSS REFERENCE TO RELATED APPLICATIONS

This application is a continuation/continuation-in-part of U.S. patent application Ser. No. 10/860,931 filed on Jun. 4, 2004 now U.S. Pat. No. 7,190,096. The disclosure of the above application is incorporated herein by reference.

FIELD

The disclosure relates generally to electromechanical actuators for controlling movement of mechanical components, devices or machines.

BACKGROUND OF THE INVENTION

This disclosure relates to actuators. An "actuator" is defined in the Merriam-Webster's Collegiate Dictionary, Tenth Edition as a mechanical device for moving or controlling something. Actuators perform a myriad of functions and enable many modern conveniences.

Various mobile platforms, e.g. aircraft, buses, trains, ships and various other vehicles, use actuators to perform many functions during operation of the mobile platform. For example, aircraft utilize actuators to control the movement of flaps, spoilers and ailerons in each wing during operation of the aircraft. Actuators in the tail of an aircraft control the rudder and elevators, while actuators in the fuselage open and close the doors that cover the landing gear bays. Additionally, actuators are utilized to raise and lower the landing gear of the aircraft and actuators on each engine control thrust reversers by which the plane is decelerated.

In addition to uses in mobile platforms, such as aircraft, actuators are used in computer disk drives to control the location of the read/write head on which data is stored and read from the disk. Actuators are used in robots, i.e., in automated factories to assemble products. Actuators operate brakes on vehicles; open and close doors; raise and lower railroad gates and perform numerous other tasks of everyday life.

Prior art actuators fall into two general categories: hydraulic and electric, with the difference between the two categories being the motive force by which movement or control is accomplished. Hydraulic actuators require a pressurized, incompressible working fluid, usually oil. Electric actuators use an electric motor, the shaft rotation of which is used to generate a linear displacement using some type of transmission.

A drawback with hydraulic actuators is the plumbing required to distribute and control the pressurized working fluid. For example, in an aircraft, a pump that generates high-pressure working fluid and the plumbing required to route the working fluid add weight and increase design complexity because the hydraulic lines must be carefully routed.

Electric actuators, which are powered and controlled by electric energy, require only wires to operate and control but a drawback with prior art electrical actuators can be their reliability. Windings of electrical motors are susceptible to damage from heat and water. Bearings on motor shafts wear out. The transmission between the motor and the load, and which is inherently more complex than the piston and cylinder used in a hydraulic actuator, is also susceptible to wear and tear, and eventually to failure. While electrical actuators have advantages over hydraulic actuators, an electrically-powered actuator that provides increased reliability, would be a significant improvement over the prior art. Fault-tolerance, i.e., the ability to sustain one or more component failures or faults and remain operational, would also provide an improvement over prior art electrical actuators.

SUMMARY

In various embodiments an electromechanical actuator (EMA) is provided. The EMA includes a threaded output ram connectable to a mechanical component and at least one motor module engageable with the output ram for controllably translating the output ram along a linear axis of the output ram. The actuator further includes a torque sensing adaptive control (TSAC) system for monitoring torque within the motor module. The TSAC generates a disengagement command signal when the TSAC system determines torque within the motor module is outside an allowable motor module torque range. The disengagement command signal initiates disengagement of the motor module from the output ram.

The EMA provides a fault tolerant actuator having low cost, accurate torque sensing system to detect friction within a motor module of the EMA to provide reliable redundancy within the EMA to effectively prevent failure of the actuator and potentially hazardous conditions that could result from such a failure.

DETAILED DESCRIPTION OF INVENTION

Figure 1:
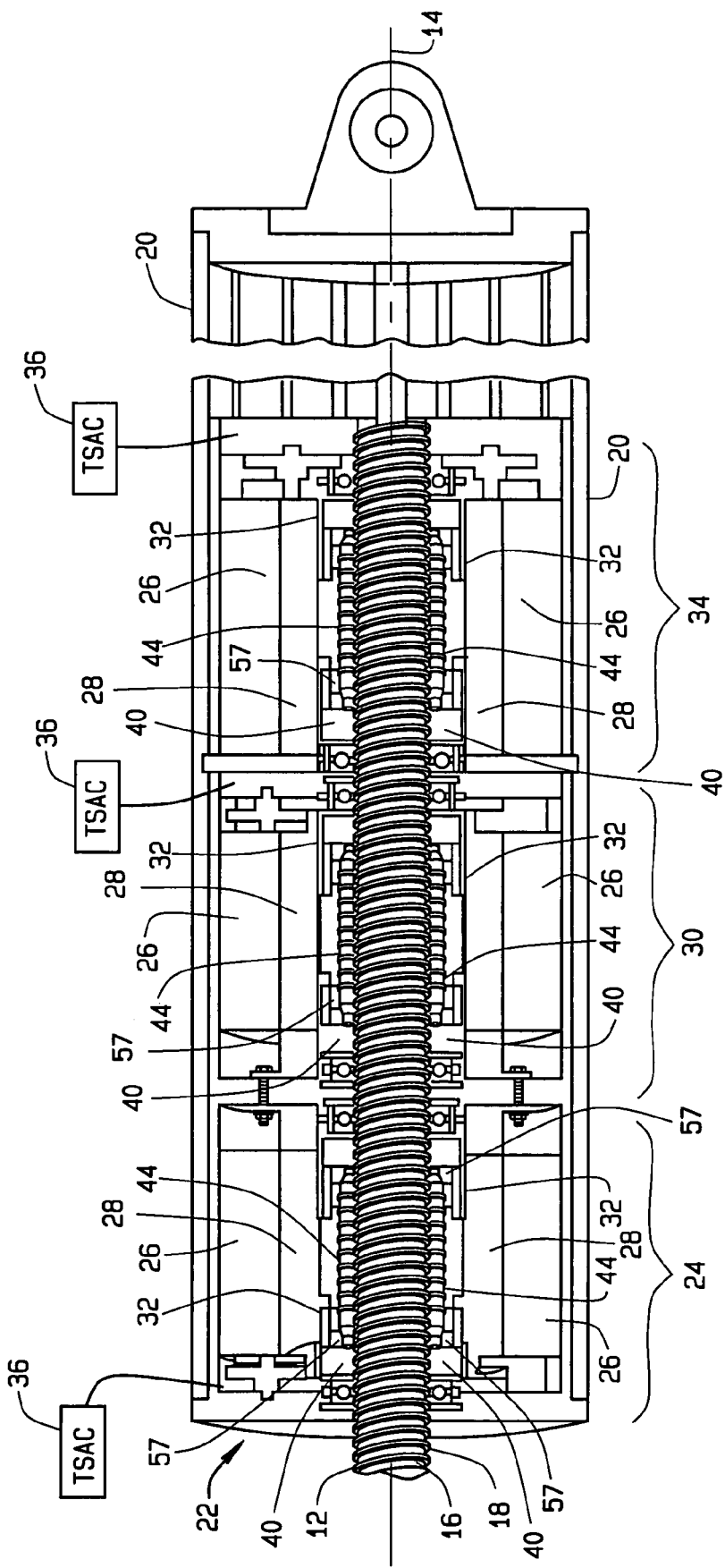
FIG. 1 is a cross-sectional view of an fault-tolerant electromechanical actuator (EMA), in accordance with various embodiments of the disclosure.
Figure 1A:
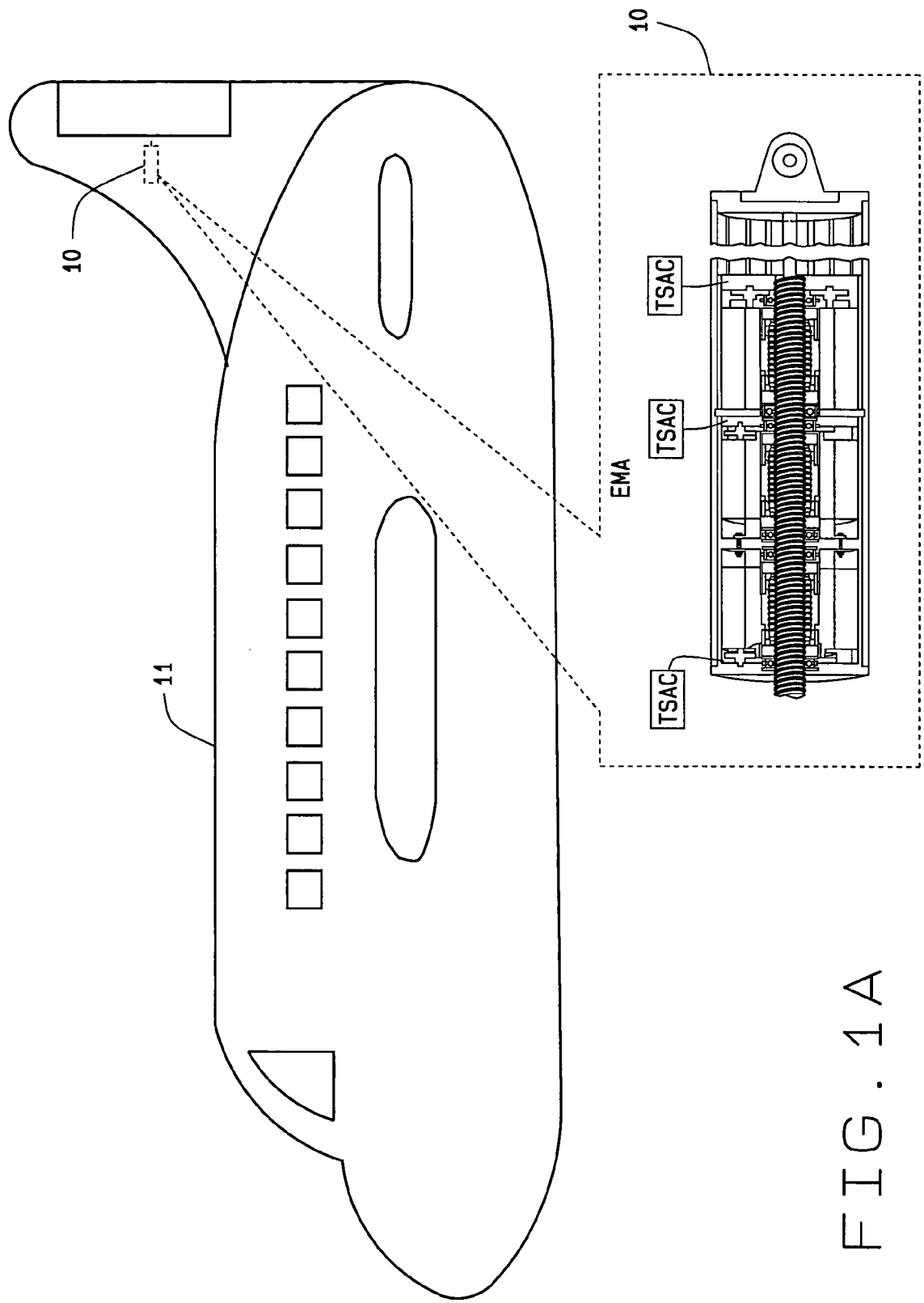
FIG. 1A is a schematic of a mobile platform including the EMA shown in FIG. 1, in accordance with various embodiments of the present disclosure.

FIG. 1 is a cross-sectional view of an electrically powered and fault tolerant electrical actuator 10, in accordance with various embodiments. The fault tolerant electrical actuator 10 can be utilized in various applications to control the movement of one or more mechanical components, devices or machines. For example, the fault tolerant electrical actuator 10 can be implemented in a mobile platform 11, exemplarily shown as an aircraft, to control the movement of mobile platform control mechanisms or surfaces. For example, the mobile platform 11 can be an aircraft that utilizes the fault tolerant electrical actuator 10 to control the movement of flaps, spoilers and ailerons in each wing during operation of the aircraft. Although mobile platform 11 is illustratively shown as an aircraft, the mobile platform 11 can be any mobile platform inclusive of, but not limited to, an aircraft, a bus, a train or a ship.

Generally, the actuator 10 is comprises a cylindrically-shaped housing 20 that encloses two or more integrated electrical motor modules (three shown) 24, 30 and 34 that each include a roller nut 32 that can drive an output ram 12, the exterior surface 16, which is helically threaded. Helical threads 18 (also referred to as "threads") on the output ram 12 surface are threaded into one or more of the roller nuts 32 within the housing. The roller nuts 32 can engage the threaded output ram 12 and rotate about the output ram 12, but are laterally fixed in the housing, i.e., the roller nuts 32 cannot move along the length of the output ram 12. Therefore, when the roller nuts 32 are rotated about the output ram 12, the output ram 12 will be laterally moved along a longitudinal central axis 14 of the output ram 12. When the end of the output ram (not shown in FIG. 1) is connected to a mechanical component, device or machine, such as an aircraft's control surface, lateral movement of the ram 12 operates or controls the mechanical component to which the output ram 12 is coupled.

The output ram 12 can be extended from and retracted into the housing simply by controlling the direction of rotation of at least one of the roller nuts 32 that engages the threaded surface 16. The roller nut 32 rotation direction is readily changed by the electrical power provided to field windings 26 of the motor modules 24, 30 and 34 that drive the output ram 12.

More particularly, the exterior surface 16 of the output ram 12 includes the helical threads 18 such that the ram 12 can be considered to be "threaded" as is a bolt or screw. The helical threads 18 enable the ram 12 to be axially moved by engaging the threads 18 of the output ram 12 with a rotating roller nut 32 of at least one motor module 24, 30 and 34 within the housing 20. The roller nut 32 of each motor module 24, 30 and 34 is structured and arranged to rotate about the axis 14 and engage to the threads 18, but is laterally fixed within the respective motor module 24, 30 and 34 in the housing 20. That is, the roller nuts 32 cannot move along the axis 14 of the output ram 12. The threads 18 pitch will affect the speed of output ram 18 (i.e., the rate at which it travels axially) as well as the load exerted on each of the motor modules 24, 30 and 34.

As shown in FIG. 1, the housing 20 has at least one opening 22 in one end through which the output ram 12 can extend and retract so as to impart control or movement to a mechanical component, device, machine or machine part (not shown in FIG. 1). In at least one embodiment illustratively shown in FIG. 7, the actuator 10 includes a double-acting output ram 12. Accordingly, the housing 20 includes a second opening 22A opposite the first opening 22. For clarity and simplification, the second opening 22A is not shown in FIG. 1.

Each motor module 24, 30 and 34 has a stator 26, also known as a field or field winding shown in cross section in FIG. 1. As is well known, application of an electrical current to the field winding 26 will induce one or more magnetic fields that extend into an armature 28 of the respective motor module 24, 30 and 34, thereby causing the armature 28 to rotate. As well known in the art, an armature is also commonly referred to as a rotor, and the two terms will be used interchangeably herein. Each field winding 26 lies against the inside wall of the cylinder-shaped housing 20, which also acts as a heat sink for the motor windings. The structure of the armature 28 of each motor module 24, 30 and 34 is such that each roller nut 32 functions as a portion of the armature 28 of each motor module 24, 30 and 34. More specifically, the armature 28 of each motor module 24, 30 and 34 includes the roller nut 32 that includes a plurality of threaded rollers 44 engageable with the threads 18 of the output ram 12. The threaded rollers 44 can engage the threads 18 and can rotate about the output ram 12, but are laterally fixed. Therefore, the roller nut 32 of each motor module 24, 30 and 34 acts as the armature 28 caused to rotate by the magnetic field generated by the respective field 26 and drive the output ram 12. The roller nut 32 is capable of selectively being engaged with and disengaged from the threads 18 on the output ram 12.

Figure 2:
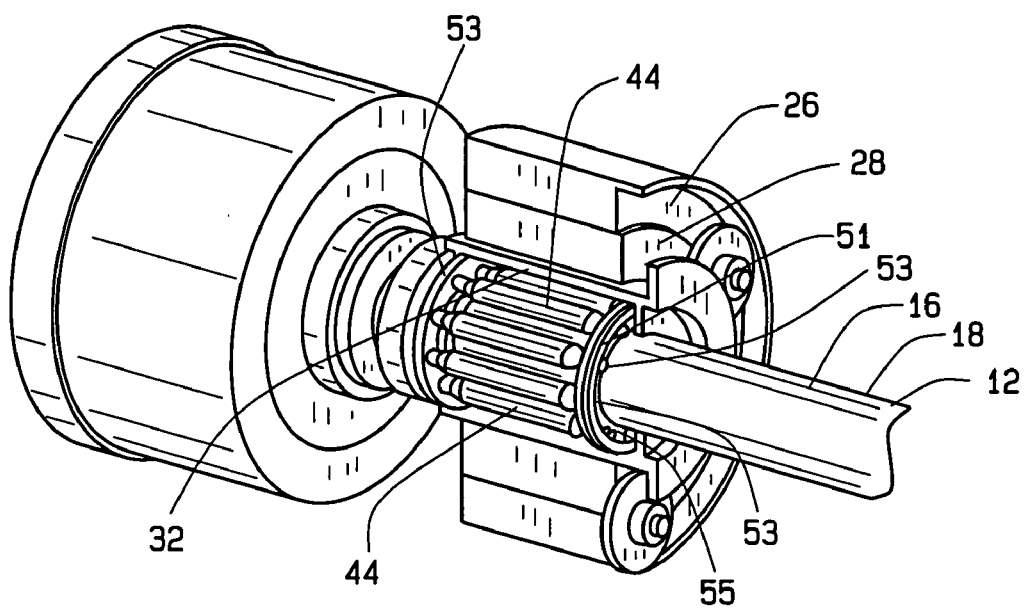
FIG. 2 is a perspective, partial sectional view of a motor module included in the actuator shown in FIG. 1.
Figure 2A:
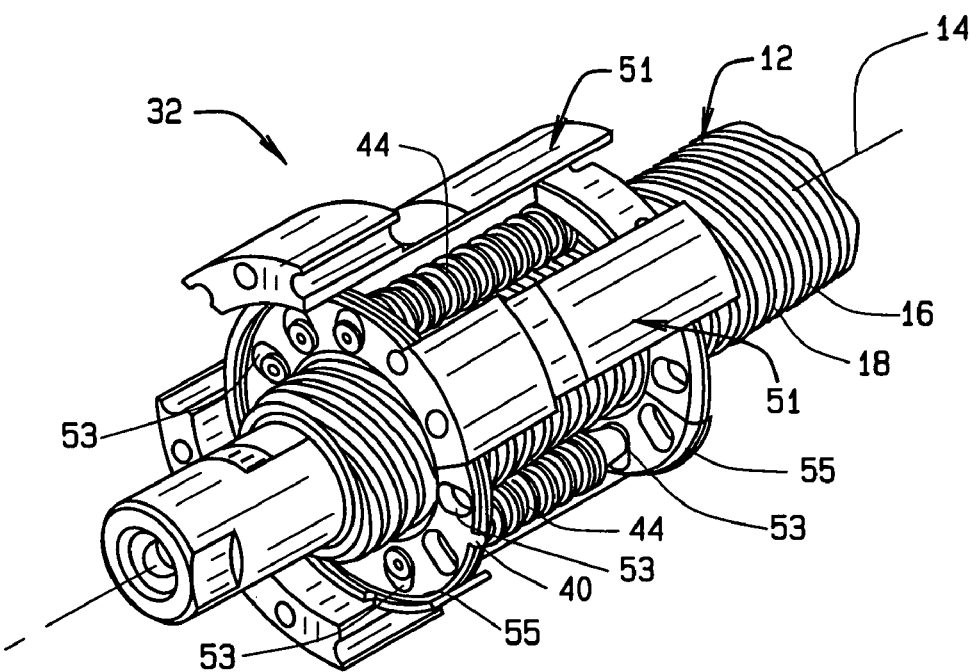
FIG. 2A is an isometric sectional view of a roller nut assembly included as a portion of an armature of the motor module shown in FIG. 2.
Figure 2B:
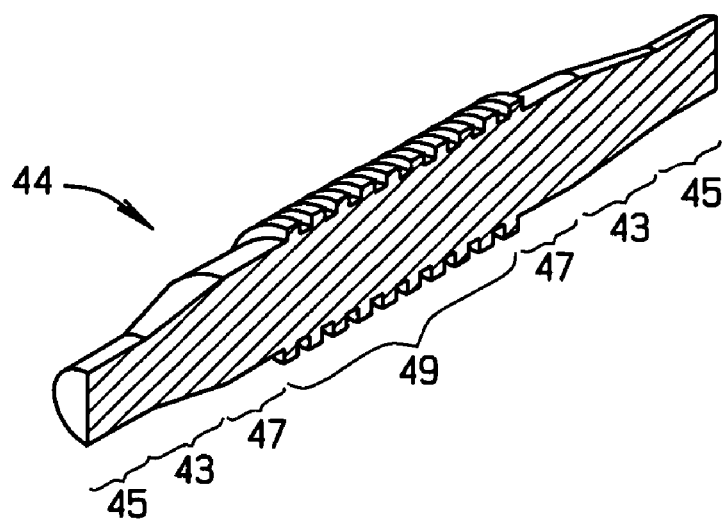
FIG. 2B is a cross-sectional perspective view of a helical threaded roller included in the roller nut shown in FIG. 2A.

Referring now to FIGS. 1, 2A and 2B, the roller nut 32, of each motor module 24, 30 and 34 includes two or more helical-threaded rollers 44 evenly spaced around the output ram 12, and can be engaged with the threads 18 in the output ram 12. The rollers 44 are held in place laterally, but are freely rotatable around the ram 12 by way of the roller nut 32 that is laterally restrained in the housing 20. When the rollers 44 are engaged with the output ram 12 and the field 26 is energized, the generated magnetic field causes the roller nut 32 to rotate about the output ram 12. Accordingly, the rollers 44 are caused to rotate around the output ram 12 and exert a lateral force along the longitudinal central axis 14 on the threads 18. The lateral force on the threads 18 cause the ram 12 to move laterally along the central axis 14.

Figure 3:
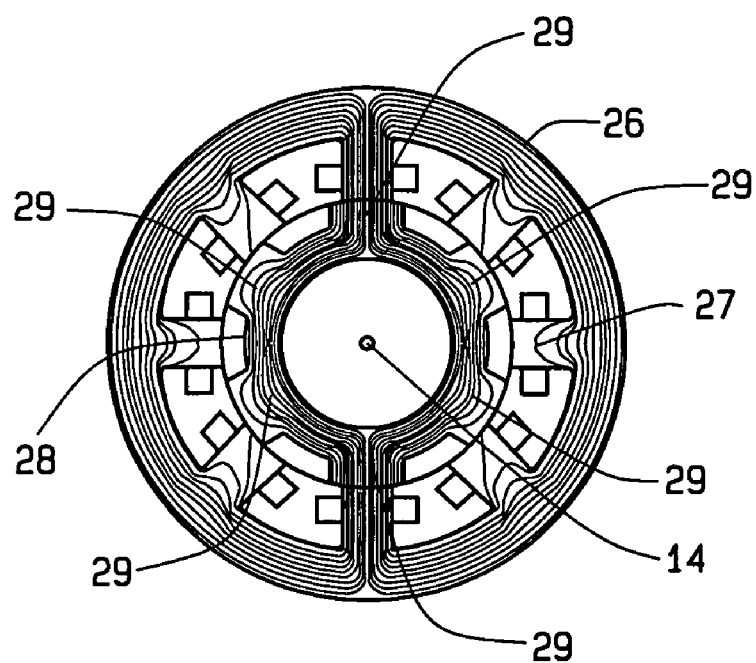
FIG. 3 is an end view depicting the electrical poles of the stator and armature of the electric motor module shown in FIG. 2.

Referring to FIGS. 2A, 2B, 3 and 4, in various embodiments, the roller nut 32 includes bearing caps 55 at opposing ends that radially separate two or more, helically-threaded rollers 44 that mate and can be engaged with the threads 18 in the output ram 12. The threads of the rollers 44 are sized and shaped to mate with the threads 18 on the surface 16 of the output ram 12 such that the rollers 44 can smoothly rotate about the output ram 12. Those of skill in the art will appreciate that roller thread pitch should match the thread pitch of the output ram 12. The electrical representation of one of the motor modules 24, 30 or 34, shown in FIG. 3, illustrates that the roller nut 32 with the included rollers 44 functions as an armature. The armature 28 has six poles 29 around the axis 14 that correspond to one of a plurality of band sections 51 extending between bearing caps 55. Each pole 29 acts to enclose a roller 44 and provide a path for magnetic lines of flux. The armature structure 28, i.e., the roller nut 32, will rotate in response to the magnetic fields created about the armature 28 by the stator 26. Rotation of the roller nut 32 causes the rollers 44 to rotate about the central axis 14. Those of skill in the art will recognize that when engaged with the output ram 12, the rollers 44 will also rotate about their axes of rotation albeit in the opposite direction than the rotation of the roller nut 32.

The band sections 51 run parallel to the rollers 44 and carry magnetic flux lines, strengthen the roller nut 32, and help maintain the radial separation between the rollers 44. The rollers 44 include journal bearing sections 45 at the ends of each roller 44, a central threaded section 49, and taper sections 43 just inside the journal bearing sections 45. The journals bearing sections 45 ride in small bearing holes 53 in the opposing bearing caps 55 at each end of the rollers 44. The opposing bearing caps 55 freely rotate about the output ram 12 and do not engage the threads in the output ram 12. As described further below, each of the bearing caps 55 includes a disengaging cam 40 and a ramp and lock mechanism 57 that are interactive with the taper sections 43 of each roller 44 to disengage the respective rollers 44 from the helical threads 18 of the output ram 12. Generally, the rollers 44 are disengaged using a complementary taper 42 in the ramp and lock mechanisms 57, best seen in FIG. 4A, which slides "under" the taper section 43, causing the roller 44 to be lifted upward, disengaging the roller 44 from the output ram 12. Thus, the bearing caps 55, i.e., the ramp and lock mechanisms 57, of a motor module 24, 30 and/or 34 are urged toward each other to disengage the respective rollers 44 if the respective motor module 24, 30 and/or 34 fails.

During operation, the fault-tolerant electromechanical actuator or "EMA" 10 generates signals such as voltage, current, speed and position of the armature/roller nut 32. The EMA 10 includes at least one torque sensing adaptive controller (TSAC) system 36, shown in FIG. 12, that monitors such things as the voltage, current and armature speed of each motor module 24, 30 and 34, and output ram position to detect when an improper torque is being developed by one or more of the motor modules 24, 30 and/or 34. For example, the TSAC system can detect improper torque caused by excessive friction, indicative of fouling or failure a motor module 24, 30 or 34 that is engaged with the output ram 12, by sensing an unusually-high current drawn by the respective motor module 24, 30 and/or 34.

Figure 4:
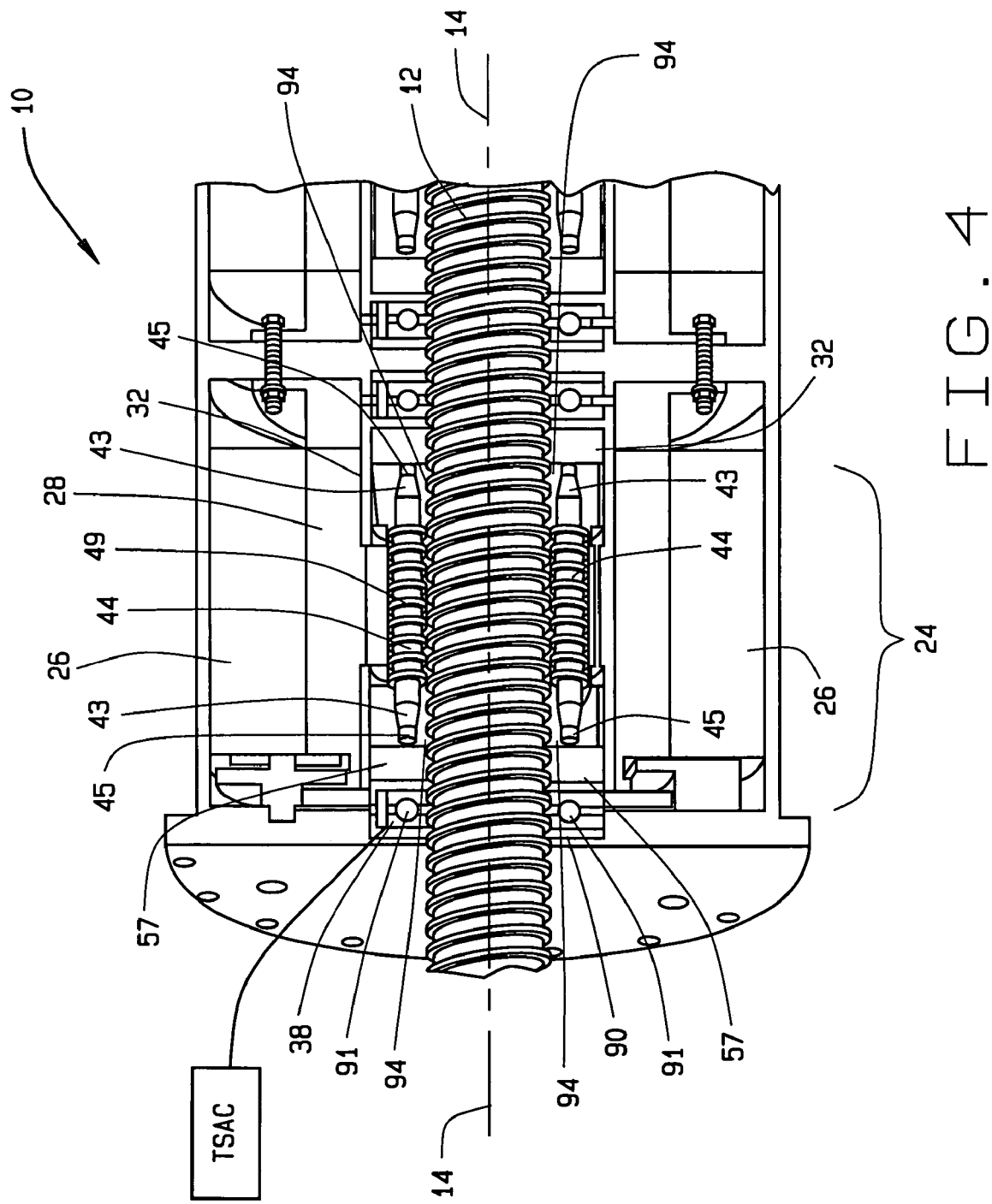
FIG. 4 is a perspective sectional view of a motor module included in the electrical actuator shown in FIG. 1.
Figure 4B:
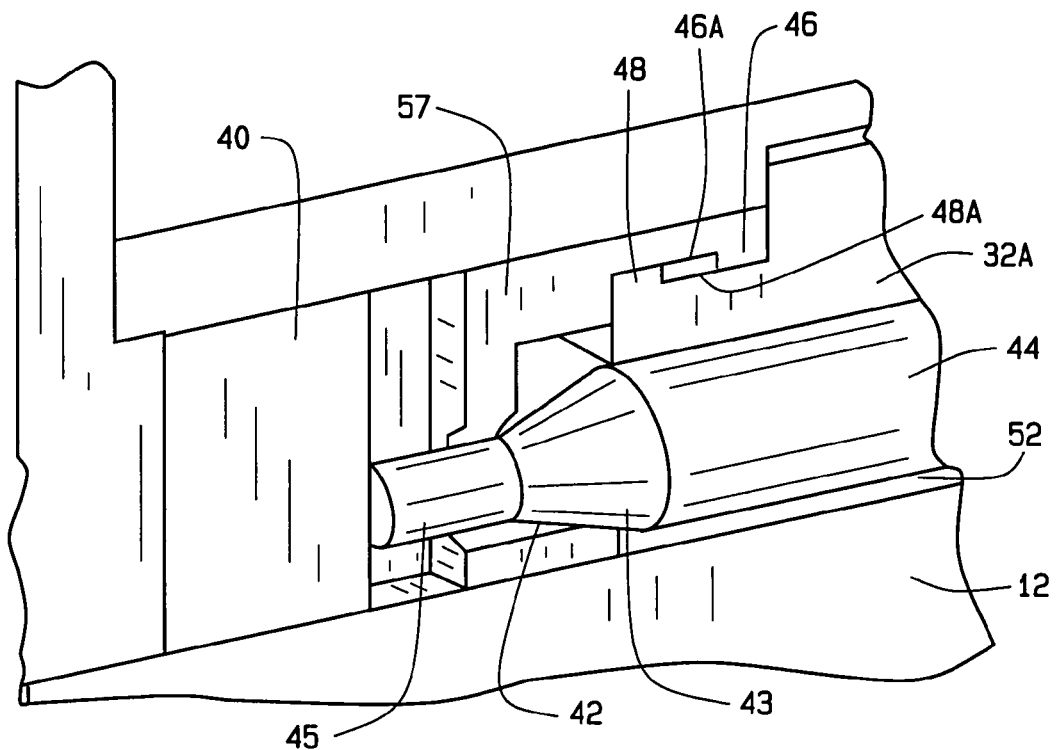
FIG. 4B is a perspective sectional view of the portion the roller nut shown in FIG. 4A, illustrating a ramp and lock mechanism in a second position.
Figure 4A:
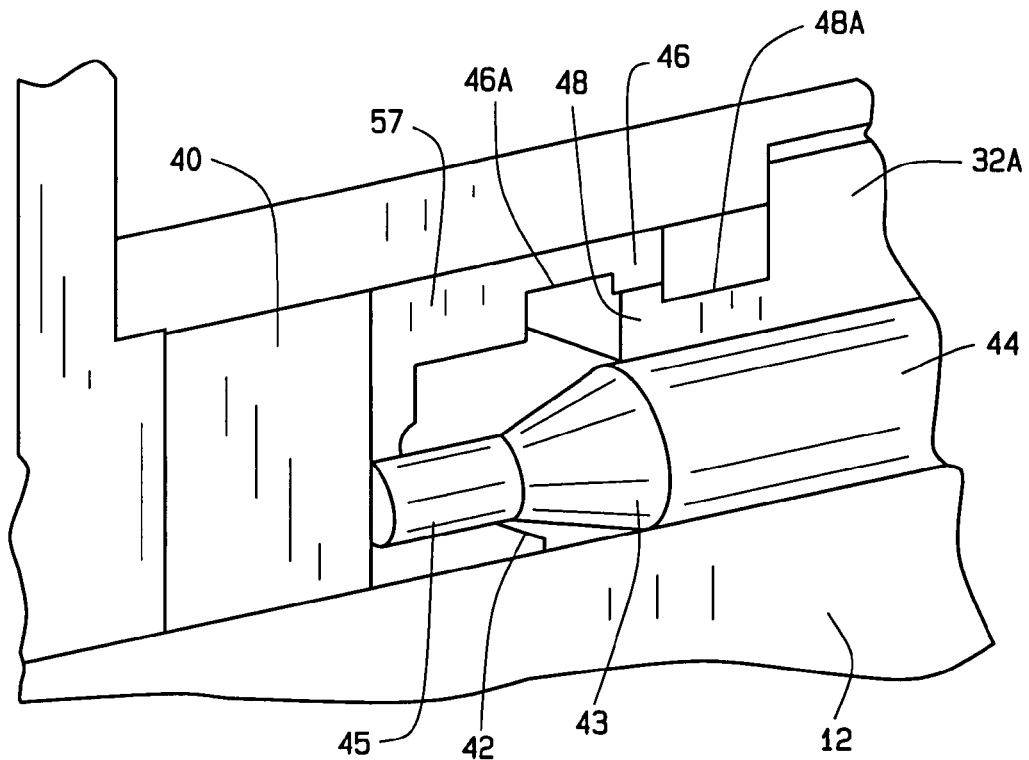
FIG. 4A is a perspective sectional view of a portion of the roller nut shown in FIG. 2A, illustrating a ramp and lock mechanism in a first position.

Referring to FIGS. 1, 4, 4A and 4B, friction within each motor module 24, 30 and 34 of the EMA 10 is effectively constant and referred to as the Coulomb friction torque. The threads 18 of the output ram 12 and the mating threads of the roller 44 illustrated in FIGS. 4A and 4B have been removed for simplicity and clarity. However, FIG. 4A clearly illustrates the ramp and lock mechanism 57 in a first position whereby the roller 44 is engaged, i.e., in contact, with the output ram 12. Similarly, FIG. 4B clearly illustrates the ramp and lock mechanism 57 in a second position whereby the roller 44 is disengaged, i.e., not in contact, with the output ram 12 such that an intercostal gap 52 exists between the roller 44 and the output ram 12. Additionally, for clarity and simplicity, FIGS. 4A and 4B only illustrate a single roller 44, but it should be understood that description herein referring to FIGS. 4A and 4B is applicable to all rollers 44 included in each motor module 24, 30 and 34.

At zero relative rotational speed, the friction torque of a motor module 24, 30 or 34 is equal and opposite to the torque applied by the magnetic field generated by the stator 26, unless the applied torque is larger than the stiction torque. The stiction torque is the torque at the moment of breakaway and is larger than the Coulomb torque. If a motor module 24, 30 and/or 34 fails, e.g., a motor module 24, 30 and/or 34 binds, jams, is contaminated or has excessive wear, improper, e.g., excessive, frictional or stiction torque is detected by the TSAC system 36. The EMA 10 will be described herein as including a plurality of TSAC systems 36 such that a separate, independent TSAC system 36 monitors a respective one of motor modules 24, 30 and 34. However, it should be understood that alternatively, the EMA 10 can include a single TSAC system to substantially simultaneously monitor all the motor modules 24, 30 and 34. Additionally, the TSAC systems 36 can be mounted inside the housing 20 or located remotely from the EMA 10.

In various embodiments, when improper torque is sensed in a motor module 24, 30 and/or 34, the respective TSAC system 36 activates a disengeagement actuation device 38, e.g., an electromagnetic coil or piezo electric device, causing a disengaging cam 40 to laterally move the ramp and lock mechanism 57 along the axis 14, thereby disengaging the rollers 44 by lifting the rollers 44 away from the output ram 12.

Referring now to FIGS. 1, 2, 2A, 2B, 4, 4A and 4B, once the ramp and lock mechanism 57 disengages the rollers 44 of the problematic motor module 24, 30 and/or 34, the ramp and lock mechanism retains the rollers in the disengaged position. More particularly, the ramp and lock mechanism includes a first locking finger 46 that interlocks with a second locking finger 48 in a locking portion 31 of the roller nut 32 when the ramp and lock mechanism 57 is in the second position, whereby the rollers 44 are disengaged from the output ram 12, as shown in FIGS. 4A and 4B. As seen in FIG. 4A, when the ramp and lock mechanism 57 is in the first position with the rollers 44 engaged with the output ram 12, distal ends of the first and second fingers 46 and 48 are in full contact. When the distal ends of the first and second fingers 46 and 48 are in full contact, the rollers 44 are engaged and can not disengage until the disengagement actuation device 38 is actuated to move the ramp and lock mechanism 57 to the second position. When the disengagement actuation device 38 is actuated, disengaging cam 40 pushes the ramp and lock mechanism laterally inward along the axis 14 such that the complementary taper 42 slides under the roller tapered portion 43. As the ramp and lock mechanism 57 moves inward, the interaction between the ramp and lock complementary taper 42 and the roller tapered portion 43 lifts the roller away from the output ram 12. Furthermore, as the ramp and lock mechanism moves inward, the distal ends of the first and second fingers 46 and 48 are moved out of contact with each other and into locking recesses 46A and 46B. Thus, the ramp and lock mechanism 57 is moved to the second position whereby the first and second fingers 46 and 48 are interlocked.

Therefore, when actuated, the disengagement actuation device 38 provides lateral movement of the ramp and lock mechanisms 57 along the axis 14 to lift the rollers 44 from engagement with the output ram 12 and interlock the ramp and lock mechanisms first and second fingers 46 and 48. Thus, the rollers 44 of a motor module 24, 30 and/or 34 can be disengaged from the output ram 12 when the rollers 44 are lifted away from the threads 18, allowing the roller nut 32 to rotate freely about the output ram 12. The rollers 44 are lifted away from the threads 18 using the tapered sections 43 between the straight journal section 45 and the threaded section 49. When the complementary taper 42 in the ramp and lock mechanisms 57 are forced against and under the tapered sections 43, the rollers 44 are moved radially outward, away from the output ram 12 and out of engagement with the threads 18.

In some embodiments, to activate the ramp and lock mechanisms 57 when improper torque is sensed in a motor module 24, 30 or 34, the TSAC system 36 of the respective motor module 24, 30 or 34 applies a voltage/current to a coil 90 of the respective disengagement actuation device 38. The coil 90 becomes an electromagnet and produces a magnetic line of flux that is transferred through small air gaps in a thrust bearing 91 to an opposing magnetic field on the ramp and lock mechanisms 57. As the current increases, the magnetic flux builds causing the ramp and lock mechanisms 57 to move such that the rollers 44 are lifted upward and away from contacting the threads 18 of the output ram 12. When the rollers 44 are disengaged, the ramp and lock mechanisms 57 is locked in place eliminating the respective motor module 24, 30 or 34 from contact with the output ram 12. When a motor module 24, 30 and/or 34 is operating to drive the output ram 12, the ramp and lock mechanisms 57 is free of any magnetic contact with the electrical coil 90 and the rollers 44 are fully engaged with the output ram 12.

Referring now to FIGS. 1 and 4, in various embodiments, the roller nuts 32, i.e., the rollers 44, of all of the motor modules 24, 30 and 34 in the housing 20 are powered and engaged with the threads 18 in the output ram 12, also referred to herein as the motor modules being engaged with the output ram 12. Therefore, all the motor module(s) 24, 30 and 34 are operating to provide torque used to move the output ram 12 laterally along the axis 14 and share the load presented by the output ram 12. When one or more of the motor modules 24, 30 and/or 34 fails, the respective roller nut(s) 32 is/are disengaged from the output ram 12. More specifically, when the TSAC system 36 of a failing motor module 24, 30 or 34 senses an improper torque level, the TSAC system 36 activates the ramp and lock mechanisms 57 of the respective motor module 24, 30 and/or 34 to disengage the respective roller nut 32 from the output ram 12. When the roller nut 32 of the failing motor module(s) 24, 30 and/or 34 is/are disengaged, also referred to herein as disengaging the motor module, the other motor module(s) 24, 30 and/or 34 that remain engaged with the output ram 12 and operating substantially seamlessly assume the load exerted by the output ram 12 without interference from the disengaged motor module 24, 30 and/or 34.

In various other embodiments, all of the motor modules 24, 30 and 34 are engaged with the output ram 12, but only one motor module 24, 30 or 34 is powered, i.e., operating, to provide torque used to move the output ram 12 laterally along the axis 14. The other motor module(s) 24, 30 or 34 are not operating and are driving the load presented by the output ram 12. Thus, the additional engaged, but non-operational, motor module(s) 24, 30 or 34 is/are available as a "back-up" or redundant motor module(s). When the driving motor module 24, 30 or 34 fails, the ramp and lock mechanisms 57 of the failing motor module 24, 30 or 34 is activated to disconnect the respective roller nut 32 from the threads 18 of the output ram 12. More specifically, when the TSAC system 36 of the failing driving motor module 24, 30 or 34 senses an improper torque level, at least one engaged, but non-operating redundant motor module(s) 24, 30 and/or 34 is/are put into operation and the ramp and lock mechanisms 57 of the failing driving motor module 24, 30 or 34 is activated to disengage the respective roller nut 32. Accordingly, the newly activated redundant motor module(s) 24, 30 and/or 34 that is/are put into operation substantially seamlessly assume(s) the load exerted by the output ram 12 without interference from the disengaged motor module 24, 30 or 34.

In yet other embodiments, two or more motor modules 24, 30 and 34 are engaged with the output ram 12 and powered. Therefore, two or more of the motor modules 24, 30 and 34 are operating to provide torque used to move the output ram 12 laterally along the axis 14 and share the load presented by the output ram 12. A single additional motor module 24, 30 or 34 is also engaged with the output ram 12, but is not operating to drive the load presented by the output ram 12. Thus, the additional engaged, but non-operational motor module 24, 30 or 34 is available as a "back-up" or redundant motor module. When any of driving motor modules 24, 30 or 34 fails, the ramp and lock mechanisms 57 of the failing motor module 24, 30 or 34 is activated to disconnect the respective roller nut 32 from the output ram 12. More specifically, when the TSAC system 36 of the failing driving motor module 24, 30 or 34 senses an improper torque level, the engaged, but non-operating redundant motor module 24, 30 or 34 is activated and the roller nut 32 of the failing driving motor modules 24, 30 or 34 is disengaged. Accordingly, the newly activated redundant motor module 24, 30 or 34 that is put into operation substantially seamlessly assume(s) the load exerted by the output ram 12 without interference from the disengaged motor module 24, 30 or 34.

In still other embodiments, only one motor module 24, 30 or 34 is engaged with the output ram 12 and bears the entire load exerted by the output ram 12. Thus, the additional disengaged, non-operational motor module(s) 24, 30 or 34 is/are available as a "back-up" or redundant motor module(s). When the driving motor module 24, 30 or 34 fails, the ramp and lock mechanisms 57 of the failing motor module 24, 30 or 34 is activated to disconnect the respective roller nut 32 from the output ram 12. More specifically, when the TSAC system 36 of the failing driving motor module 24, 30 or 34 senses an improper torque level, the roller nut(s) 32 of the disengaged, non-operating motor module(s) 24, 30 or 34 is/are engaged with the output ram 12 and the roller nut 32 of the failing driving motor module 24, 30 or 34 is disengaged. Accordingly, the newly activated redundant motor module(s) 24, 30 or 34 that is/are put into operation substantially seamlessly assume(s) the load exerted by the output ram 12 without interference from the disengaged motor module 24, 30 or 34.

Referring now to FIGS. 1, 2B and 4, in various aforementioned embodiments, one or more of the motor modules 24, 30 and/or 34 is/are initially disengaged. In such embodiments, the disengagement actuation device 38 of the disengaged, redundant, motor module(s) 24, 30 and/or 34 is activated to hold complementary tapers 94 of the ramp and lock mechanisms 57 under the roller tapered sections 43 and retain the roller nut 32 in the disengaged position. When a redundant motor module 24, 30 or 34 is activated, the disengagement actuation device 38 is deactivated such that the complementary tapers 94 of the ramp and lock mechanisms 57 are moved out from under the roller tapered sections 43. Subsequently, one or more biasing devices, e.g., springs, in the roller nut 32 move the rollers 44 radially inward and into contact with the threads 18. Consequently, the roller nut 32 of the respective motor module 24, 30 or 34 is engaged with the output ram 12. That is, the motor module 24, 30 or 34 is engaged and able to provide torque used to move the output ram 12 laterally along the axis 14.

Whether the output ram 12 extends away from the housing 20 or retracts into the housing 20 is determined by the direction of rotation of the roller nut(s) 32, i.e., the armature 28(s), of the motor module(s) 24, 30 and/or 34 engaged with and driving the output ram 12. The rotational direction of the roller nut(s) 32 is determined electrically. Therefore, the extension or retraction of the output ram 12 of the actuator 10 is determined by controlling the power source of the motor modules 24, 30 and 34. More specifically, the power source is controlled such that the rotational direction of each motor module 24, 30 and 34 is controlled, thereby controlling whether the output ram is extended from or retracted into the housing 20. For example, if the motor modules 24, 30 and 34 are DC motors, the direction of current provided by a DC power source is controlled to control the rotational direction of the roller nut(s) 32 and thereby control the extension or retraction of the output ram 12.

In addition to changing the output ram's direction electrically, the rotational speed of the roller nut(s) 32 around the output ram 12 can be determined electrically. Therefore, the speed at which the output ram 12 is extended or retracted, can be determined electrically. For example, if the motor modules 24, 30 and 34 are DC motors, rotational speed of the roller nut(s) 32 is/are determined by the amplitude of the applied DC voltage. If the motor modules 24, 30 and 34 are synchronous AC motors, rotational speed of the roller nut(s) 32 is/are determined by the frequency of the applied AC voltage. Furthermore, for any given motor speed, i.e., roller nut 32 rotational speed, thread pitch of the output ram 12 will affect the displacement speed of the output ram 12. While a greater number of threads per inch will require more motor revolutions per unit of linear displacement, a greater number of the threads per inch will also increase the amount of force exerted by the driving motor module(s) 24, 30 and/or 34 on the output ram 12.

Figure 5:
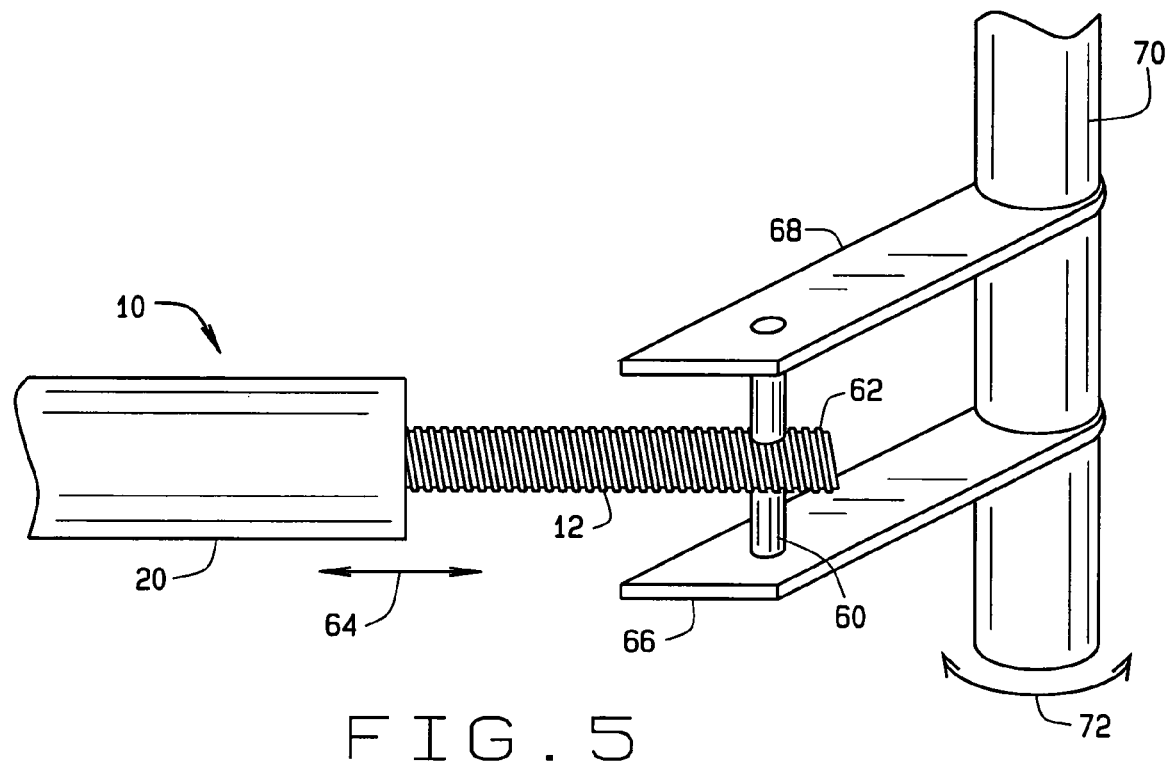
FIG. 5 shows an fault-tolerant actuator with crank arm driving a drive shaft.

Referring to FIG. 5, as is well known, a "journal" is a spindle or shaft that turns in a bearing. In its most general application, a distal end 62 of the output ram 12 of the electrically powered linear actuator 10 is attached to a journal 60 of a crank arm 68. The journal 60 is rotationally accommodated by an opening in the output ram 12 such that the journal 60 can rotate within the opening as the output ram 12 reciprocates, i.e., extends and retracts, as shown by reference numeral 64. As shown, the displacement of the journal 60 at the end of the crank arm 68 will in turn cause a drive shaft 70 of a mechanical component, device, machine or machine part controlled by the actuator 10 to oscillate about its axis of rotation, as indicated by reference number 72.

Referring again to FIG. 1, although FIG. 1 illustrates three motor modules, i.e., motor modules 24, 30 and 34, included in the actuator 10, it should be understood that the disclosure should not be so limited. The actuator 10 can include two or more motor modules such as motor modules 24, 30 and 34. It should further be understood that each motor module included in the actuator 10 are functionally and structurally substantially similar, such that the structural and functional description herein is applicable to each and every motor module of the actuator 10.

Additionally, the complementary tapers 94 of the ramp and lock mechanisms 57 in combination with the tapered sections 43 of each roller 44 should be considered to be a roller-engaging/roller-disengaging mechanism that operably engages and disengages the roller nuts 32 a motor module 24, 30 or 34 from the output ram 12.

Figure 6:
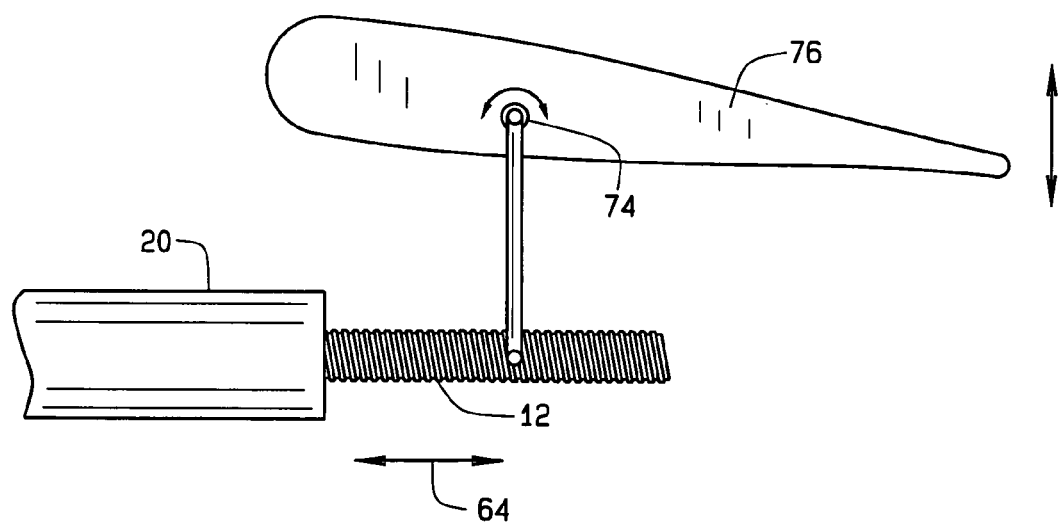
FIG. 6 shows a fault-tolerant actuator with a flight control surface of an aircraft.

Aircraft are well known to have wings that are attached to a fuselage. Control surfaces in the wings control the rate of climb and descent, among other things. The tail section attached to the rear of the fuselage provides steering and maneuverability. An engine provides thrust and can be attached to the plane at the wings, the tail or the fuselage. Inasmuch as aircraft structures are well known, their illustration is omitted here from for simplicity. Accordingly, the actuator 10 can be utilized to control the movement of flight control surfaces in the wings, tail, landing gear, landing gear bay doors and engine thrust reversers of aircraft. As shown in FIG. 6, the output end 62 of the output ram 12 can be coupled to a pivot point 74 of a control surface 76 of an aircraft (not shown for clarity, but well known in the art). Translation (lateral movement along the axis 14) of the output ram 12 in the directions indicated by the arrows 64 causes the control surface 76, e.g., spoilers, flaps, elevators, rudder or ailerons, to move and thereby controls flight of the aircraft. Similar translation can control other flight control surfaces, fuselage doors, landing gear and/or thrust reverses. The safety and reliability of an aircraft might therefore be improved by using the actuator 10 within a wing, fuselage or tail section as needed to operate flight control surfaces, landing gear, landing gear doors as well as an engine thrust reverser.

Figure 7:
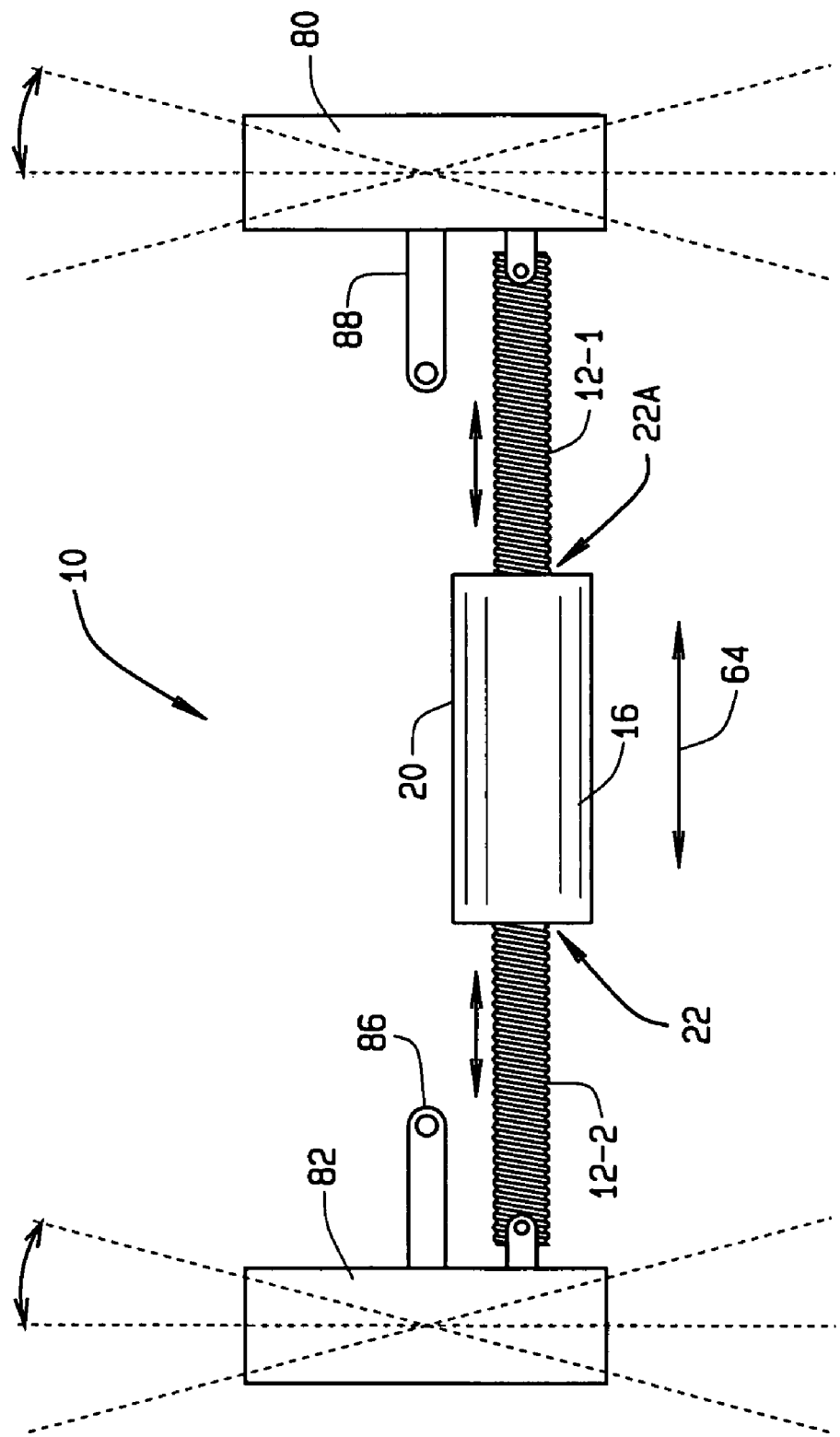
FIG. 7 shows a fault-tolerant actuator with a vehicle steering system.

Referring to FIG. 7, in various embodiments, the output ram 12 extends through both ends of the actuator housing 20. One side or end of the output ram 12-1 is connected to a first machine part 80, e.g., linkage of a first steerable wheel of a vehicle. The other side or end 12-2 is connected to a second machine part 82, e.g., linkage of a second steerable wheel of the vehicle. As the output ram 12 translates in the direction indicated in the reference number 64, the first and second machine parts 80 and 82, e.g., the first and second wheels, rotate upon the pivot points or axes 86, 88. Inasmuch as vehicles such as automobiles and trucks are well-known to have at least one steerable wheel, a chassis or frame to which the wheel is rotatably coupled, a body with doors, an engine, transmission, and brakes, all of which are well-known and do not require depiction. A significant weight reduction in such vehicles is possible by replacing a hydraulic actuator with the fault-tolerant actuator 10.

Other embodiments of the electrically powered linear actuator would include use as a power source for a lift for a door by appropriately coupling the output ram 12 to the mechanisms to which loads could be lifted and doors opened.

Figure 8:
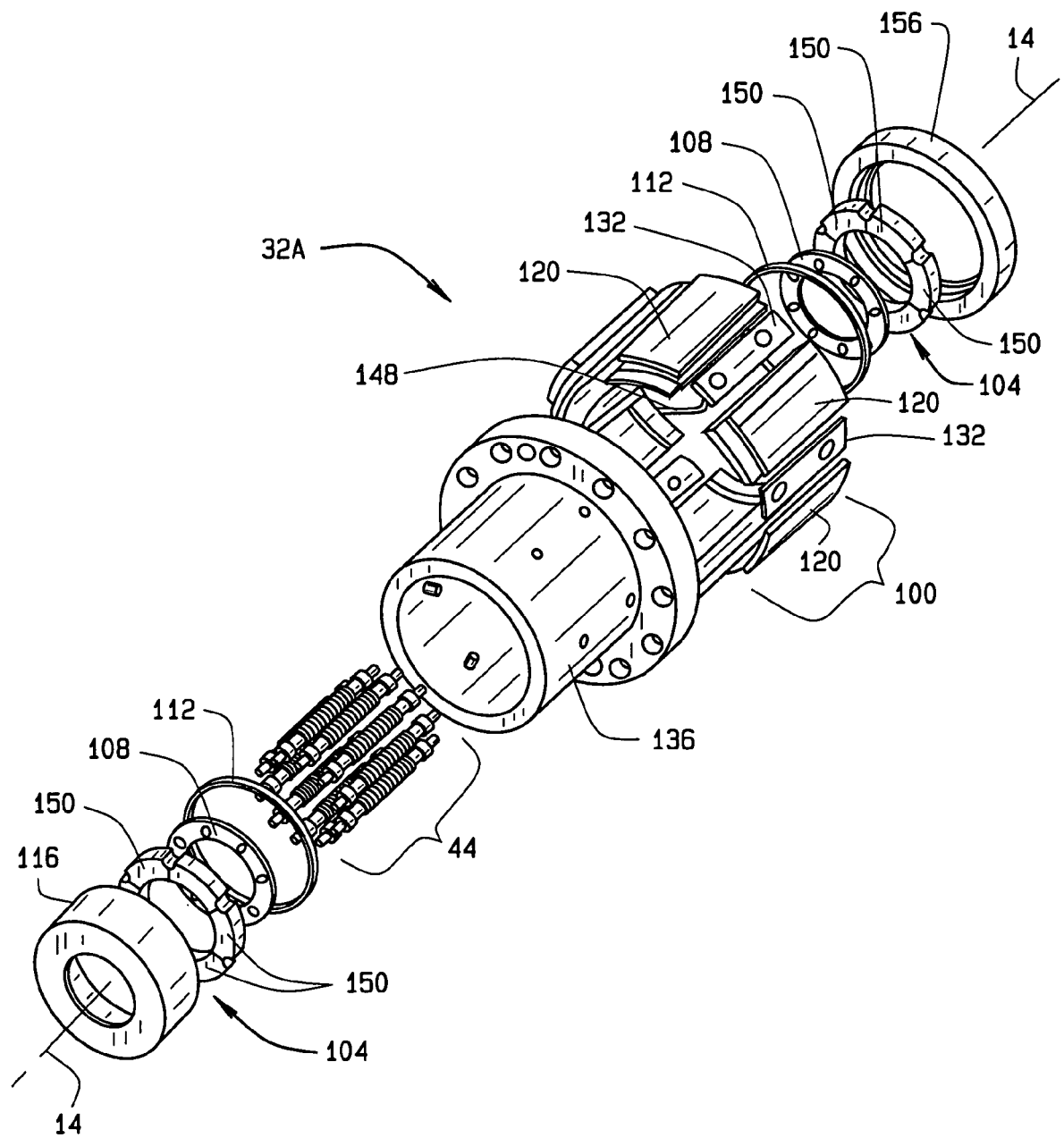
FIG. 8 is a perspective exploded view of a segmented roller nut (SRN) included in the motor module shown in FIG. 2, in accordance with various embodiments.
Figure 9:
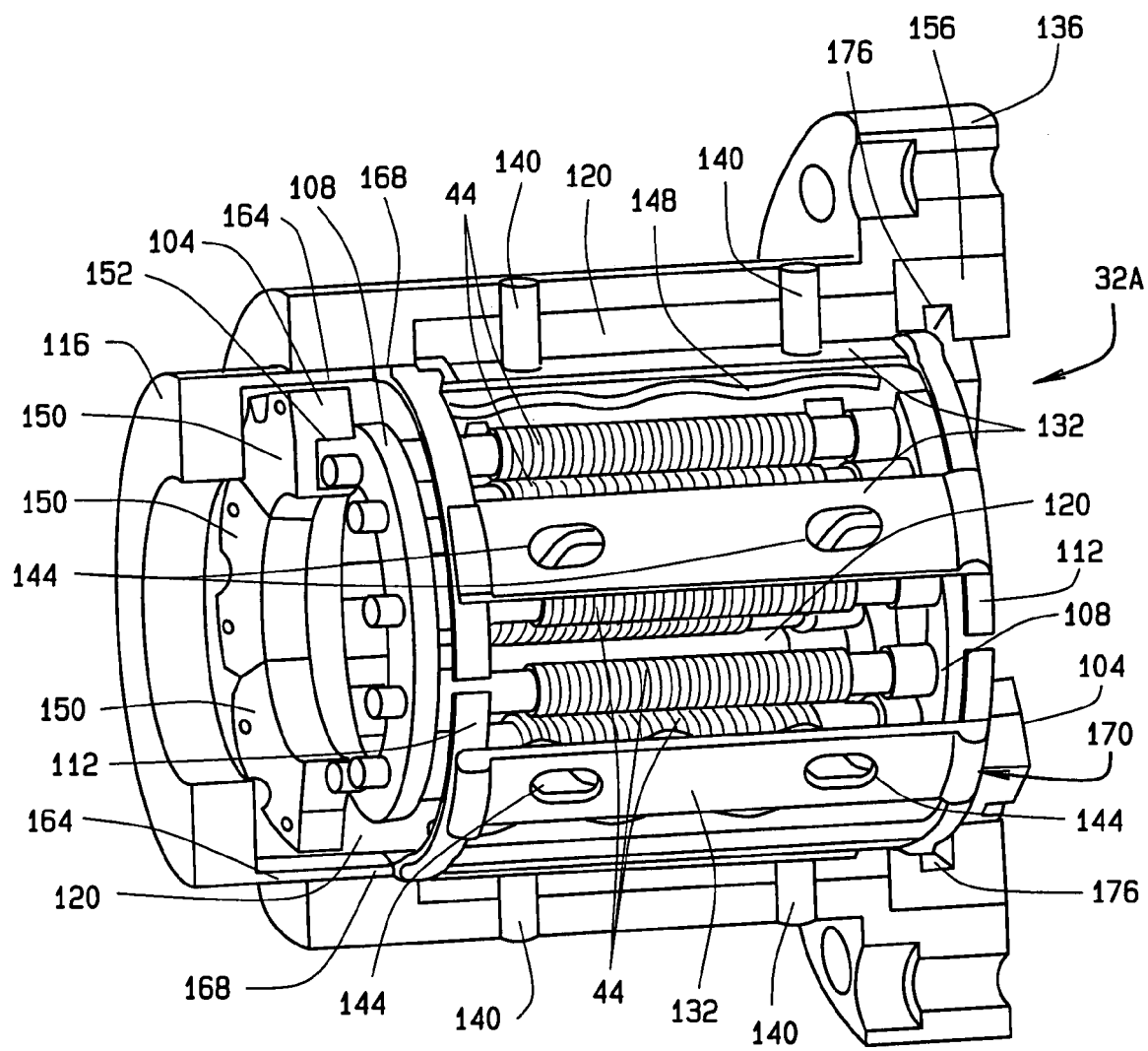
FIG. 9 is a perspective section view of the SRN shown in FIG. 8.
Figure 9A:
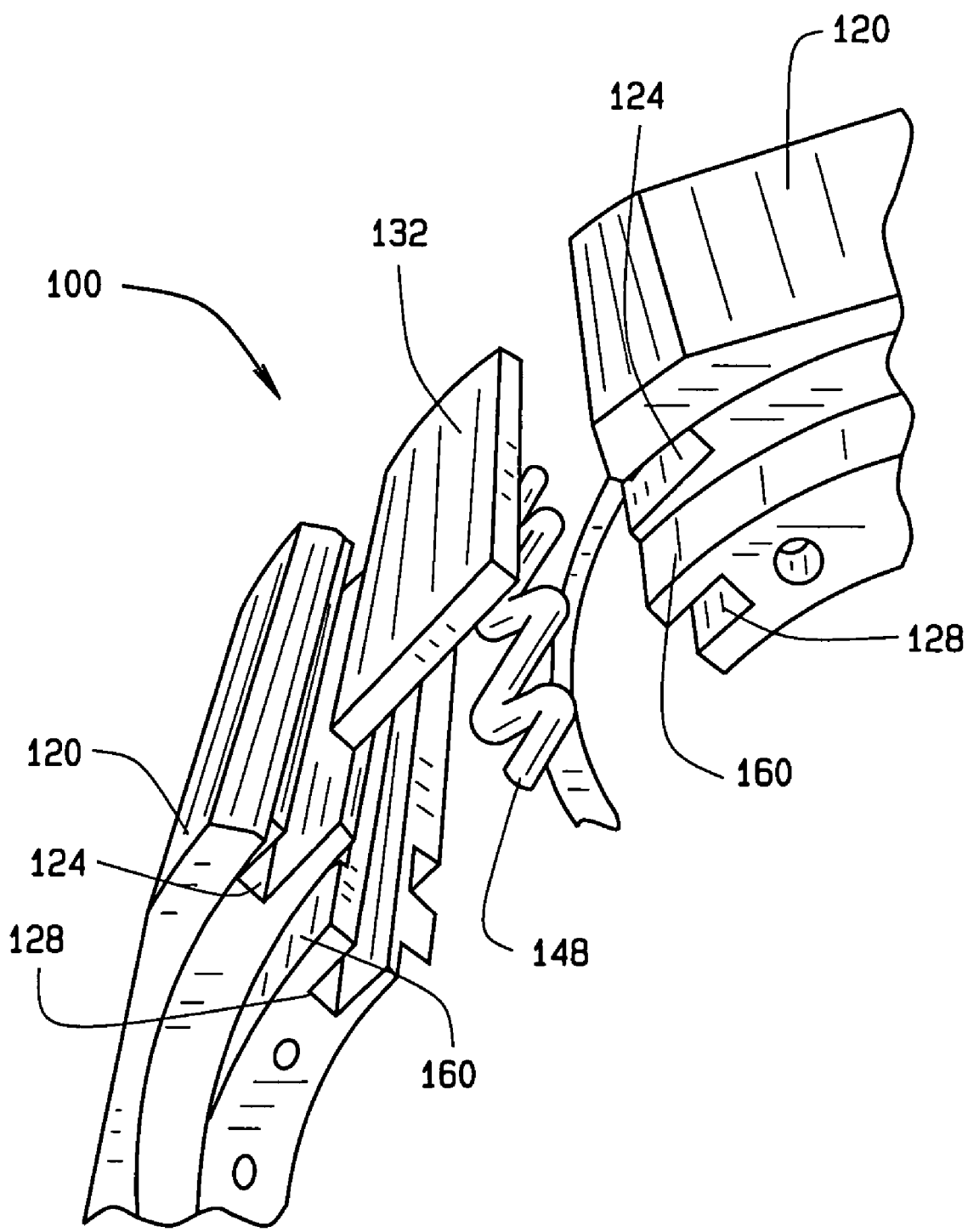
FIG. 9A is a close-up view of a section of a plate and spring portion of the SRN shown in FIG. 9.

Referring now to FIGS. 8, 9, 9A, 10, 10A, 11 and 11, in various embodiments, the roller nut 32 is a segmented roller nut (SRN), herein referred to as SRN 32A. As best illustrated in FIG. 8, the SRN 32A includes a plate and spring (P&S) portion 100, a pair of segmented brackets 104 connected to opposing ends of the P&S portion 100, a pair of spacer washers 108 adjacent the segmented brackets 104, a pair of biased retaining C-rings adjacent the spacer washers 108, the rollers 44 and a SRN disengaging cam 116. The P&S portion 100 includes a plurality of spanner plates 120. Each longitudinal edge, or side, of each spanner plate 120 includes an outer channel 124 and an inner channel 128. The outer channels 124 are adapted to slidingly receive a plurality of expansion joint plates 132 that retain the SRN 32A within a SRN sleeve 136 and allow the spanner plates 120 to radially move inward and outward between a SRN engaged position and a SRN disengaged position, as described below. One expansion joint plate 132 is slidingly retained with the outer channels 124 of adjacent spanner plates 120. The expansion joint plates 132 are retained within the SRN sleeve 136, and thus the spanner plates 120 and the SRN 32A are retained within the SRN, via retention pins 140 retained in the SRN sleeve 136 and extending into apertures 144 of each expansion joint plate 132. The inner channels 128 are adapted to receive a plurality of biasing devices 148, e.g., compression springs, that bias the spanner plates 120 radially outward and away from each other. That is, the biasing devices 148 bias joints, or spaces, between adjacent spanner plates 120 to expand, or open up, whereby the spanner plates 120 are biased to move radially outward. One biasing device 148 is slidingly retained with the inner channels 128 of adjacent spanner plates 120.

The segmented brackets 104 include a plurality of separate and independent, substantially mating roller retention sections 150. The roller retentions sections 150 are separate and independent such that when the SRN 32A is in an engaged position, described below, the roller retention sections 150 are substantially in contact with each other and effectively form an annular bracket. Furthermore, the roller retentions sections 150 are separate and independent such that when the SRN 32A is moved, or transitioned, to a disengaged position, described below, a space exists between each of the roller retention sections 150. The journals 45 of the rollers 44 extend through slotted, i.e., oblong, openings 154 (best shown in FIGS. 8, 10A and 11) in the spacer washers 108 and are rotationally fitted within recesses 152 of the roller retentions sections 150 of the segmented brackets 104. Therefore, the rollers 44 are retained between the opposing segmented brackets 104. In various embodiments, two rollers are rotationally fitted within each of the roller retentions sections 150. As illustrated in FIG. 8, the disengagement cam 116 and a retaining cap 156 are located longitudinally outward of the segmented brackets 104 and are adapted to retain the segmented brackets longitudinally inward within the sleeve 136. That is, the disengagement cam 116 and retaining cap 156 hold the segmented brackets in contact with the journals 45 of each of the rollers 44 and thus, longitudinally in place along the axis 14 within the sleeve 136. Thus, the disengagement cam 116 is positioned within the sleeve 136 at one of the sleeve 136 and the retaining cap 156 is positioned within the sleeve 136 at an opposing end of the sleeve 136. The retaining C-rings 112 are positioned along a radially outer surface of opposing lips 160 of the spanner plates 120. Thus, the retaining C-rings 112 retain the spanner plates 120 radially inward and therefore, retain the expansion joint plates 122 within the outer channels 124. Additionally, the retaining C-rings 112 held in contact with opposing ends of the expansion joint plates 122.

Figure 10:
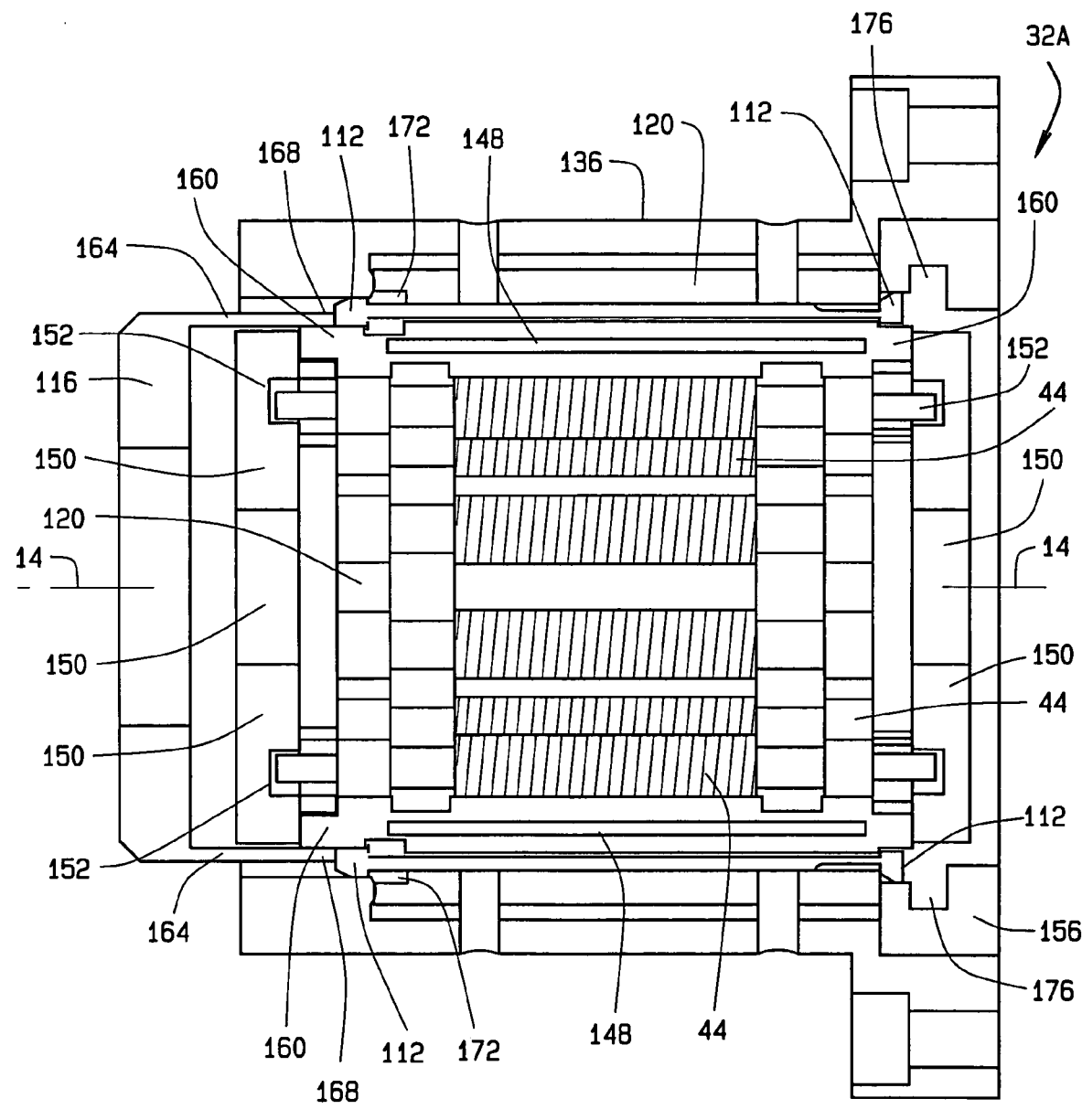
FIG. 10 is a cross-sectional view of the SRN shown in FIG. 9, illustrating the SRN in an engaged position.
Figure 11:
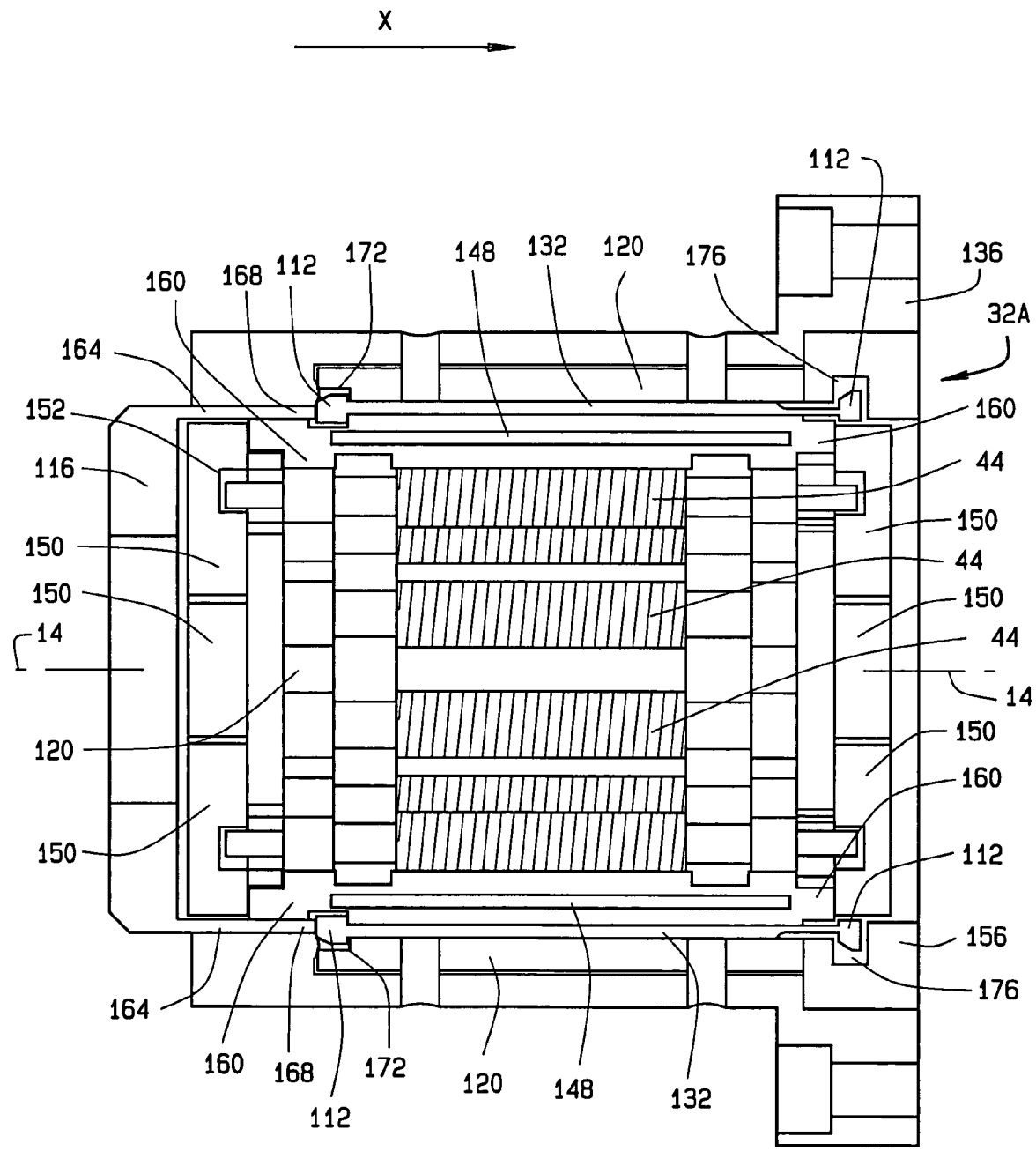
FIG. 11 is a cross-sectional side view of the SRN shown in FIG. 9, illustrating the SRN in a disengaged position.
Figure 11A:
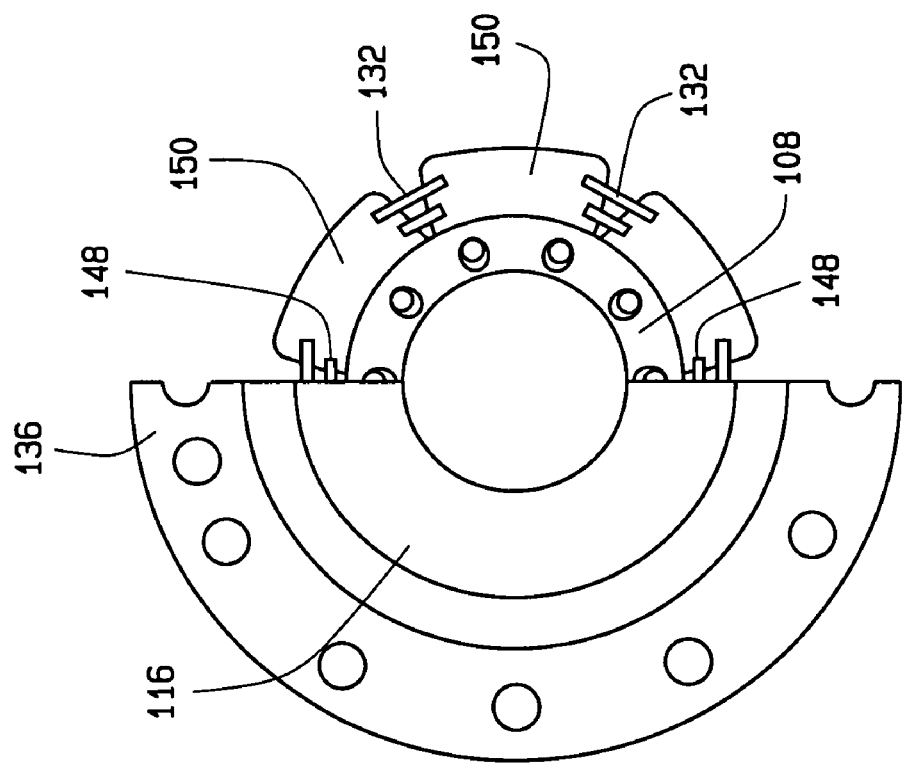
FIG. 11A is a sectional end view of the disengaged SRN shown in FIG. 11.
Figure 10A:
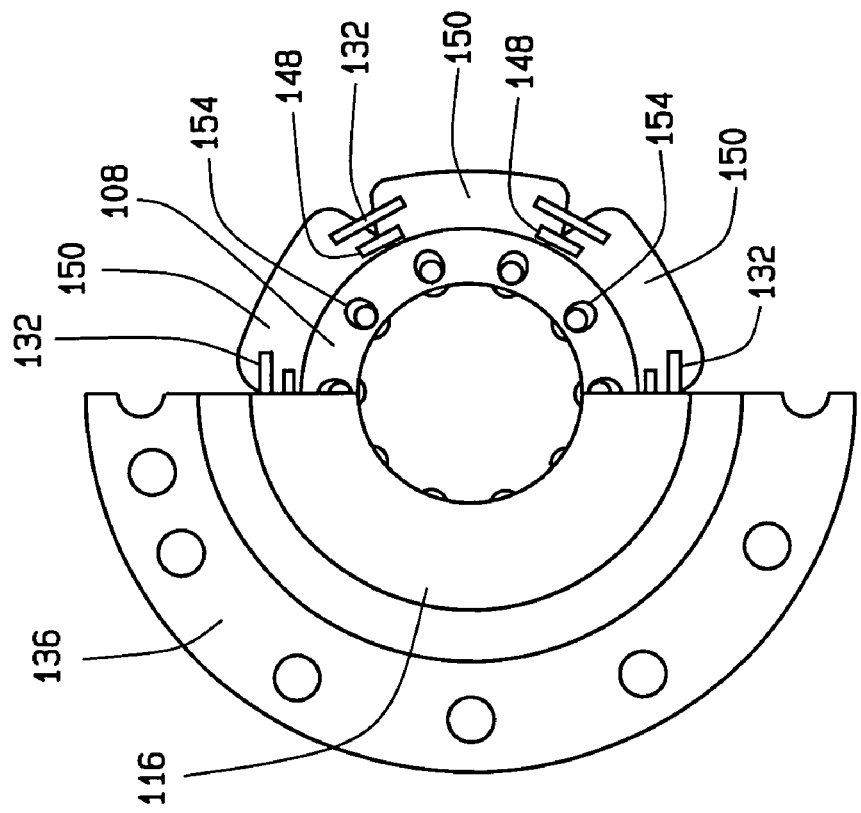
FIG. 10A is a sectional end view of the engaged SRN shown in FIG. 10.

Referring now to FIG. 10, when the SRN 32A is in an engaged position with the rollers 44 engaged with the output ram 12, the retaining C-ring 112 nearest the disengagement cam 116 is frictionally held in a slightly compressed state between the respective lips 160 and an inner surface of the SRN sleeve 136. Similarly, the retaining C-ring 112 nearest the retainer cap 156 is frictionally held in a slightly compressed state between the respective lips 160 and an inner surface of the retainer cap 156, as shown in FIGS. 10 and 11. Accordingly, the roller retentions sections 150 of the segmented brackets 104 can not move radially outward, i.e., radially away from the axis 14. Thus, the rollers 44 are held in engagement with the output ram 12. In the engaged position, the respective motor module 24, 30 or 34 can function to extend and/or retract the output ram 12 if power is provided to the motor module 24, 30 or 34 to energize the stator 26 and generate the magnetic field to rotationally drive the armature 28 and SRN 32A. If power is not provided to the respective motor module 24, 30 or 34, the SRN 32 can remain engaged but 'free-wheel' and not provide any motive force to extend or retract the output ram 12. Thus, the respective motor module 24, 30 or 34 can serve as a backup or redundant motor module.

The SRN disengaging cam 116 includes an annular sidewall 164 slidingly positioned between the inner surface of the SRN sleeve 136 and the circumferential outer edge of the respective segmented bracket 104. Additionally, the annular sidewall 164 slidingly extends past the segmented respective segmented bracket 104 between the lips 160 of the spanner plates 120 and the inner surface of the SRN sleeve 136. A distal end 168 of the annular sidewall 164 is in contact with, or close proximity to, the respective retaining C-ring 112 located nearest the disengaging cam 116, herein referred to as the 'cam-side' retaining C-ring 112. Similarly, the retaining C-ring nearest the retaining cap 156 will be referred to herein as the 'cap-side' retaining C-ring 112.

Referring now to FIG. 11, to transition the SRN 32A from the engaged position to a disengaged position with the rollers 44 disengaged from the output ram 12, the disengagement actuation device 38 is actuated to laterally move the SRN disengaging cam 116 along the axis 14 toward the retaining cap 156 in a direction X. As the disengaging cam 116 moves along the axis 14 in the X direction, the annular sidewall 164 pushes the cam-side retaining C-ring 112 in the X direction. The cam-side retaining C-ring 112 in turn pushes the expansion joint plates 132 laterally along the axis 14 in the X direction. The expansion joint plates 132 in turn push the cap-side retaining C-ring laterally along the axis 14 in the X direction. Thus, disengagement actuation device 38 moves the disengaging cam 116 in the X direction and the disengaging cam 116 moves the combination of the retaining C-rings and expansion the joint plates 132, cumulatively referred to herein as the retaining cage 170, in the X direction. The ends of each spanner plate 120 nearest the disengaging cam, referred to herein as the cam-side ends, includes a C-ring pocket 172, best shown in FIG. 10. Additionally, the retaining cap 156 includes an annular C-ring channel 176 within an interior wall of the retaining cap 156. When the retaining cage 170 is moved in the X direction by the disengaging cam 116, the cam-side retaining C-ring 112 will align with the C-ring pockets 172 of the spanner plates 120 and the cap-side retaining C-ring 112 will likewise align with the C-ring channel 176 of the retaining cap 156.

When the retaining C-rings 112 align with the respective C-ring pockets 172 and the C-ring channel 176, the biased nature of the retaining C-rings 112 will cause the retaining C-rings to expand radially outward into the respective C-ring pockets 172 and the C-ring channel 176. Thus, the retaining C-rings will no longer be slightly compressed and will no longer hold the rollers 44 in engagement with the output ram 12. More specifically, once the retaining C-rings 112 expand within the C-ring pockets 172 and the C-ring channel 176, the biasing devices 148 will no longer be held in a compressed state. Accordingly, the biasing devices 148 will force the adjacent spanner plates 120 apart and radially outward. Since the rollers 44 are rotationally held within the recesses 152 of the roller retention sections 150 of the segmented brackets 104 and the roller retention sections are coupled to the spanner plates 120, biasing devices 148 will also force the rollers 44 radially outward, away from the output ram 12. Thus, SRN 32A will be transitioned from the engaged position, wherein the rollers 44 are engaged with the output ram 12, to the disengaged position wherein the rollers 44 are disengaged from the output ram 12. Furthermore, once the retaining C-rings 112 expand within the C-ring pockets 172 and the C-ring channel 176, the radially outward biased nature of the retaining C-rings 112 will retain the retaining C-rings 112 within the C-ring pockets 172 and the C-ring channel 176. Thus, the SRN 32A is effectively locked in the disengaged position.

Figure 12:
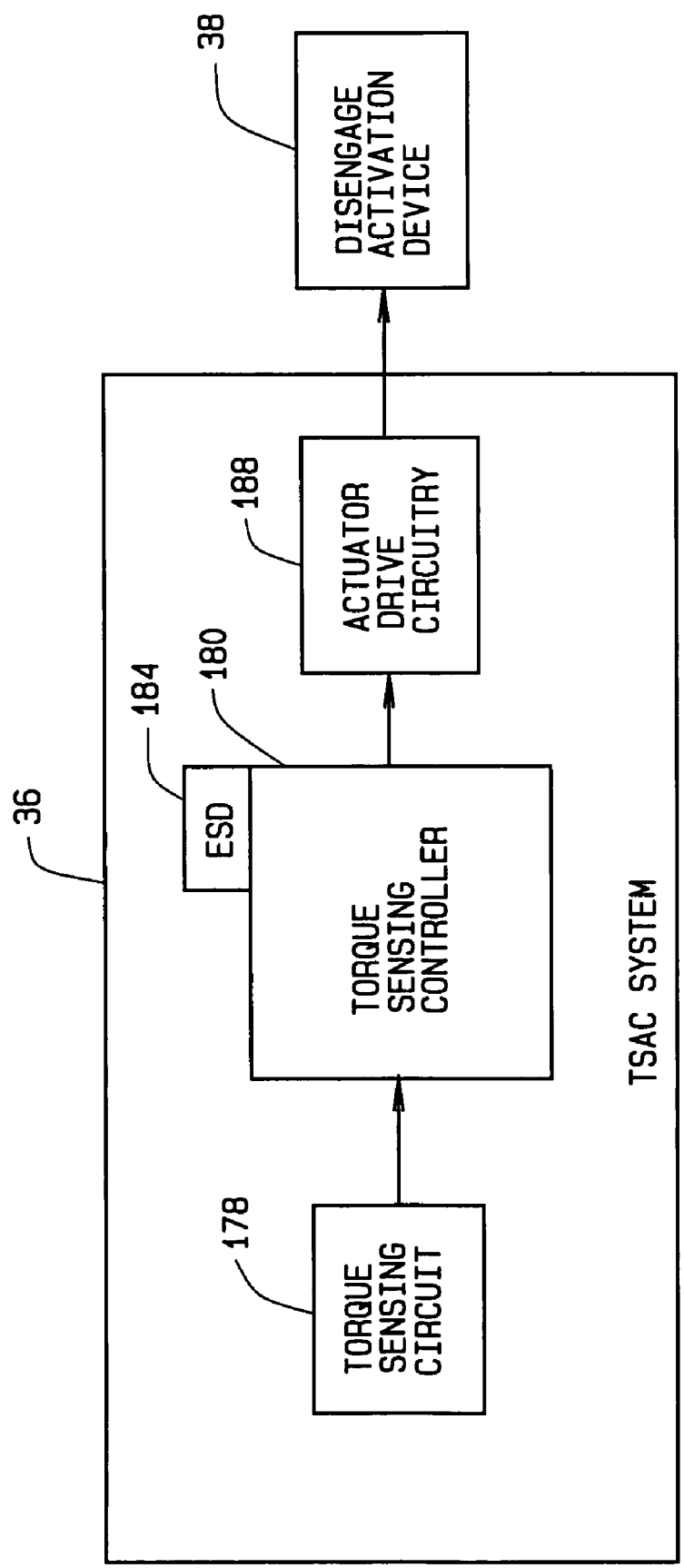
FIG. 12 is a block diagram illustrating a torque sensing adaptive (TSAC) system included in the EMA shown in FIG. 1 used to determine when excessive torque occurs in motor module shown in FIG. 2.

Referring now to FIG. 12, in various embodiments, the TSAC system 36 includes a torque sensing circuit (TSC) 178, a TSAC system controller (TSACSC) 180, e.g., a microprocessor, a computer readable electronic storage device (ESD) 184, e.g., an EEPROM, and actuator drive circuitry (ADC) 188. The TSC 178 monitors various operating parameters of the respective motor module 24, 30 or 34 and provides operating parameter data to the respective TSACSC 180. The ESD 184 has various torque monitoring algorithms stored thereon that are executable by the TSACSC 180 to analyze operating parameter data used to monitor frictional torque within the respective motor module 24, 30 and 34. If the stiction or frictional torque of the respective motor module 24, 30 or 34 is determined to be improper, i.e., falls outside a predetermined desired range, indicating motor module fouling, failure or jamming, the TSACSC 180 sends a motor disable command to the ADC 188. For example, the TSC 178 can monitor such parameters as motor module drive current, output ram position, analog & digital drive commands, rotational speed or velocity of the roller nut, i.e., roller nut 32 and/or SRN 32A, and/or applied voltage to the respective motor modules 24, 30 and 34. In response to receiving the motor disable command, the ADC 188 activates the disengagement actuation device 38 to initiate disengagement of the rollers 44 of the motor module 24, 30, or 34 determined to have improper torque. In various embodiments, the TSACSC 180 is an independent controller, e.g., microprocessor, specific to the TSAC system 36. However, in various other embodiments the TSACSC 180 can be a controller or microprocessor that is part of a separate control system and is not specific to the TSAC system 36. Thus, the TSACSC 180 could be used to perform functions regarding the EMA 10, as described herein, and to perform functions regarding to one or more other systems not related to the EMA 10.

In some embodiments, the EDS 184 contains the torque monitoring algorithms for analyzing motor module jamming identification signatures such as startup frictional torque, excessive backlash, wearing of rollers 44, and abnormal changes in torque ripple in a low frequency zone during the servomotor reversing process to determine improper torque. The ESD 184 can be external to the TSACSC 180, as shown in FIG. 12, however, the ESC 184 can be internal to the TSACSC 180 and remain within the scope of the discolsure.

Referring now to FIGS. 12, 13, 13A, 13C and 17, in various embodiments, the TSC 178 includes a torque sensor wheel (TSW) 192. The TSW 192 is included in the respective motor module 24, 30 or 34 around the SRN sleeve 136 and adjacent the stator 26. The TSW 192 includes a plurality of torque sensing elements 194 and a plurality of torque sensor slots 196 spaced apart and extending through the TSW 192 adjacent the circumferential edge of the TSW 192. The TSW 192 additionally includes a plurality of permanent magnets 198 spaced apart within or on a face 199 of the TSW 192 between various torque sensor slots 196. The TSW 192 is connected to the SRN sleeve 136. During operation of the respective motor module 24, 30 or 34, the TSW magnets 198 are repulsed by the magnetic field generated by the stator 26 such that the TSW 192 and SRN sleeve 136 rotates in synchronization with the respective roller nut, i.e., roller nut 32 or SRN 32A. As the respective roller nut rotates to drive the output ram 12, the magnetic field generated by the stator 26 also exerts a force on the torque sensing elements 194 that causes the torque sensing elements 194 to flex in relation to the amount of torque within the respective motor module 24, 30 or 34. The amount of flex is measured and communicated to the TSACSC 180 by a deflection measuring device 197.

Figure 13:
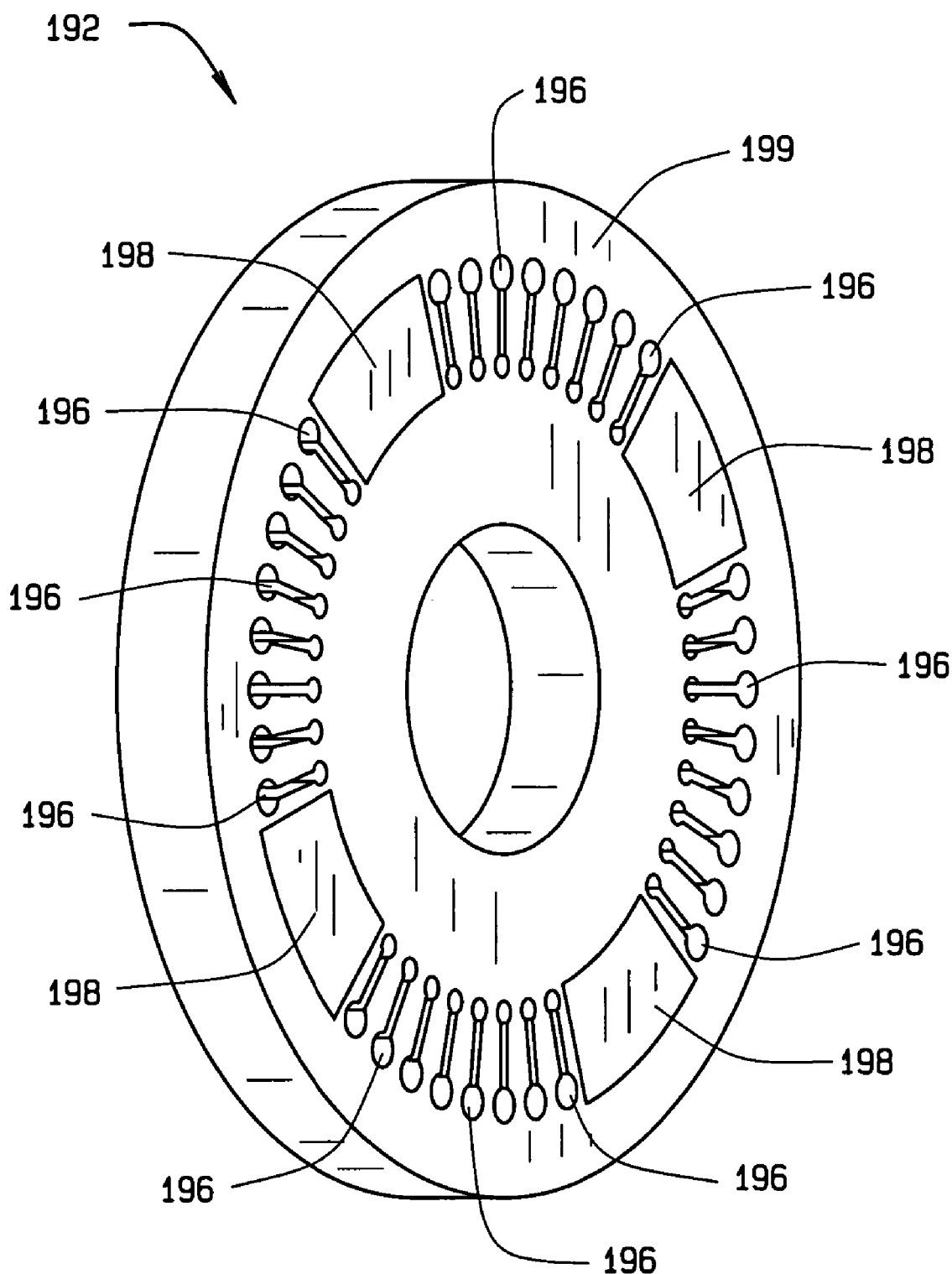
FIG. 13 is an isometric view of a torque sensing wheel used to monitor torque in the motor module shown in FIG. 2, in accordance with various embodiments.
Figure 13A:
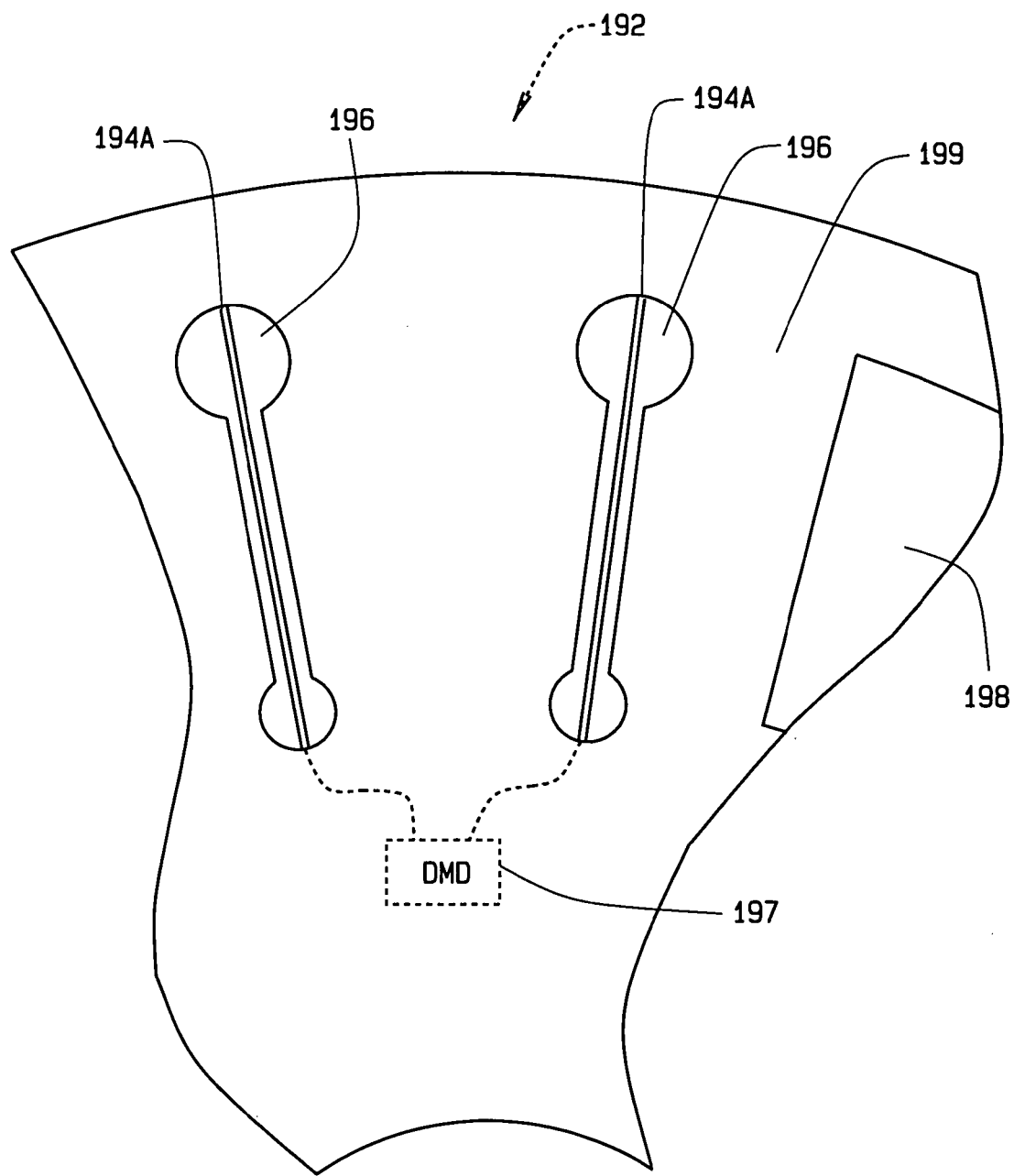
FIG. 13A is a side view of a portion of the torque sensing wheel shown in FIG. 13, illustrating torque sensing elements of the torque sensing wheel, in accordance with various embodiments of the present disclosure.

As illustrated in FIG. 13A, in various embodiments, the torque sensing elements 194 comprise a plurality of torque sensing spokes 194A within the torque sensing slots 196. As the TSW 192 rotates in synchronization with the roller nut, 32 or 32A, the magnetic field generated by the stator 26 induces a lateral force on the torque sensing spokes 194A. The lateral force causes the torque sensing spokes 194A to deflect e.g., flex, bend or twist, in relation to the amount of torque within the respective motor module 24, 30 or 34 during operation of the respective motor module 24, 30 or 34. The amount of deflection of the torque sensing spokes 194A is measured by the deflection measuring device 197, e.g., a strain gauge or a crystal metal alloy micro-actuation device. The measured deflection is representative of the amount torque within the respective motor module 24, 30 or 34, i.e., stiction or friction torque. The deflection measuring device 197 converts the measured deflection into electronic energy, e.g., voltage, that is used to generate torque data signals, e.g., voltage or resistance data signals, communicated to the TSACSC 180. The deflection measuring device 197 can communicate the torque data signals to the TSACSC 180 in any suitable manner, for example, via electrical current signals or optical signals.

Figure 13B:
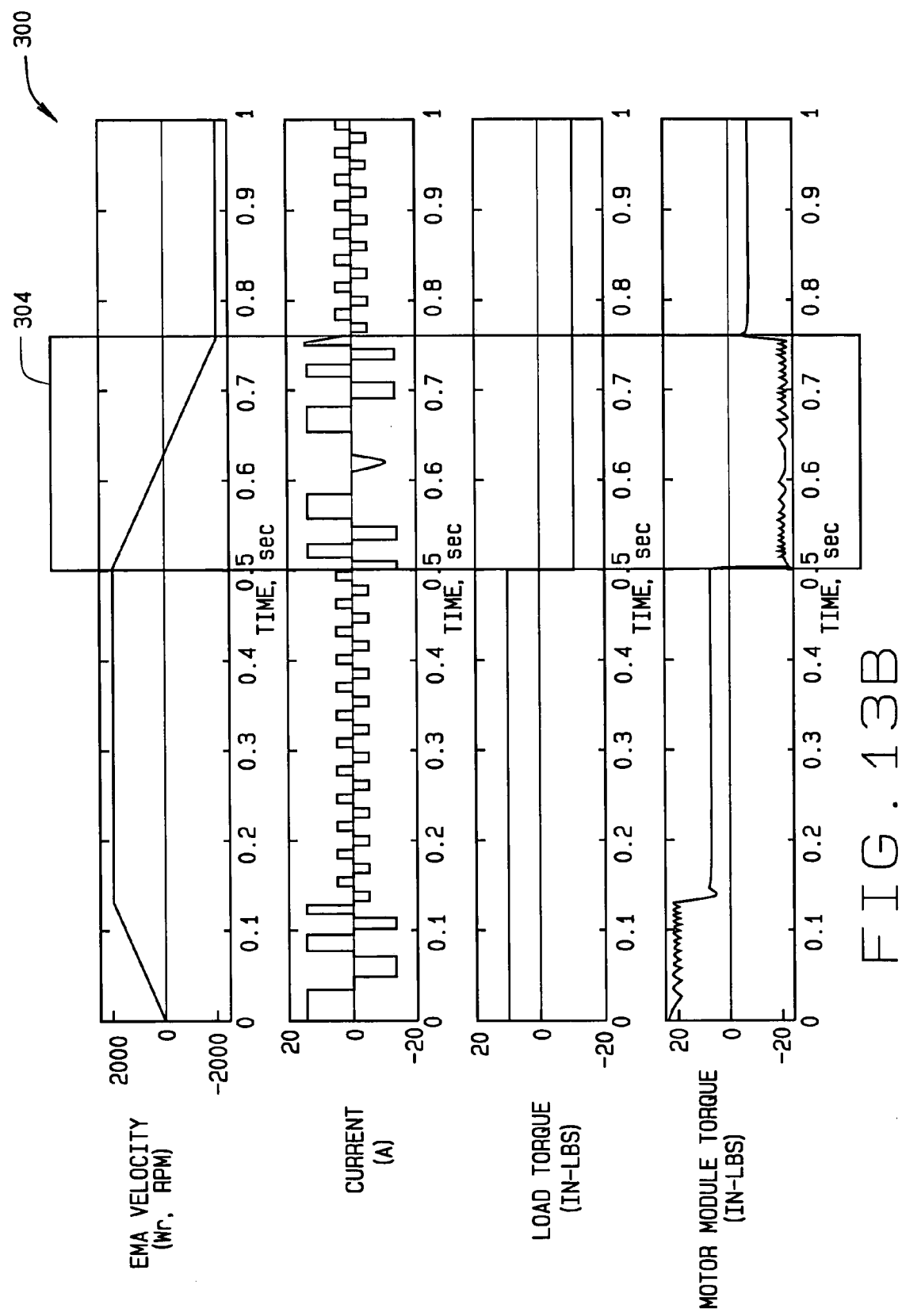
FIG. 13B is a graphical representation of various motor module characteristics monitored by the TSAC shown in FIG. 12, in accordance with various embodiments.
Figure 13C:
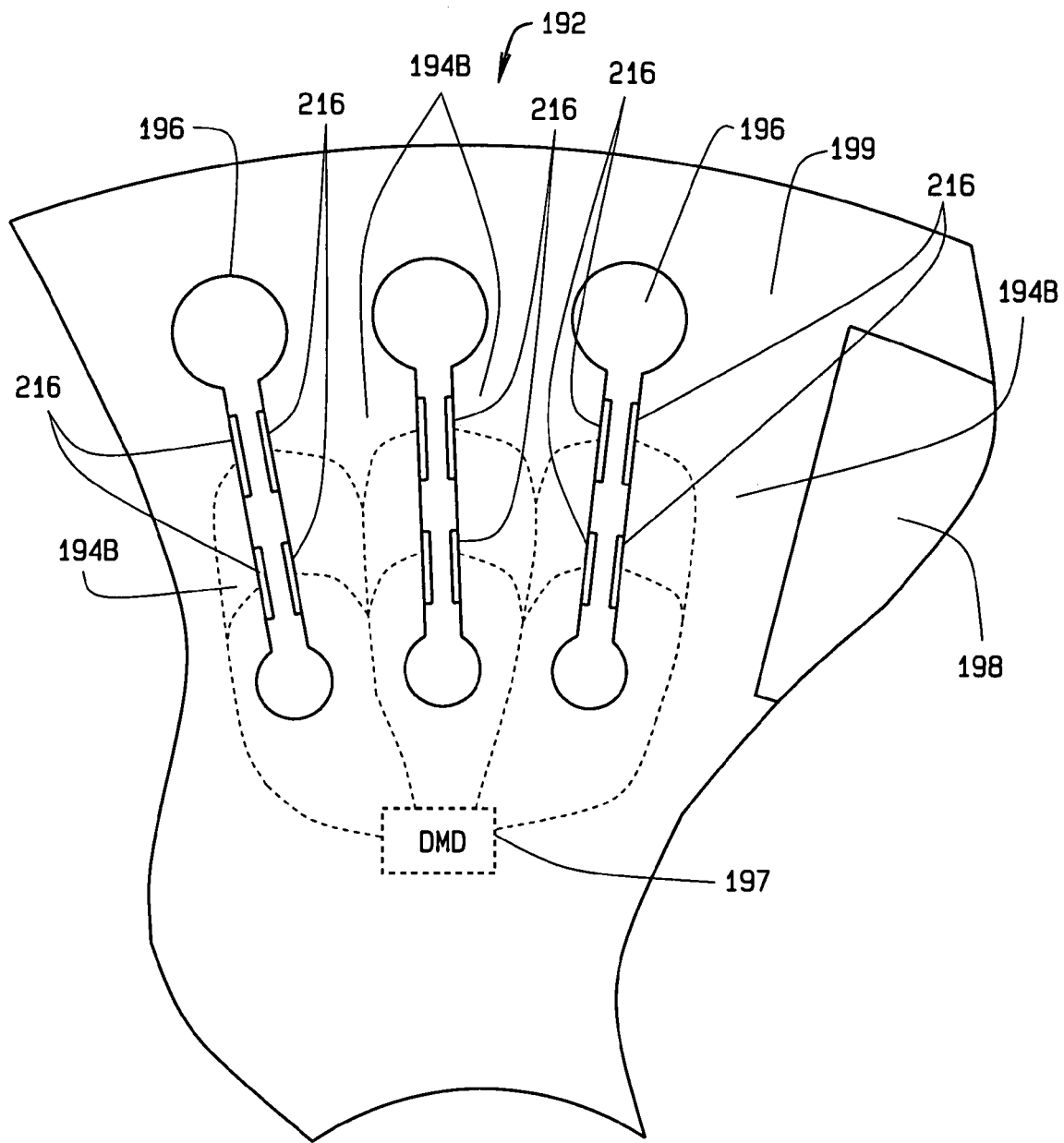
FIG. 13C is a side view of a portion of the torque sensing wheel shown in FIG. 13, illustrating torque sensing elements of the torque sensing wheel, in accordance with various other embodiments of the present disclosure.

As illustrated in FIG. 13C, in various other embodiments, the torque sensor slots 196 are formed within the TSW 192 in close proximity to each other such that torque sensing elements 194 comprise flexible beams 194B created between the sensor slots 196. Additionally, the TSW 192 includes a plurality of strain gauges 216 within the torque sensor slots 196 attached to both sides of the torque sensor slots 196. As described above, during operation of the respective motor module 24, 30 or 34, the TSW magnets 198 are repulsed by the magnetic field generated by the stator 26 such that the TSW 192 and SRN sleeve 136 rotate in synchronization with the respective roller nut, i.e., roller nut 32 or SRN 32A. As the respective roller nut rotates to drive the output ram 12, rotational forces are exerted on the flexible beams 194B causing the flexible beams 194B to deform or flex in relation to the amount of torque within the respective motor module 24, 30 or 34. More particularly, as the TSW 192 rotates, the strain gauges 214 mounted on one side of the torque sensor slots 196 will experience tension, while the strain gauges 214 on the other side of the torque sensor slots 196 will experience compression. The elastic deformation, i.e., flexing, of the flexible beams 194B changes the electrical resistance of each strain gauge 216. The strain gauges 216 communicate the change in electrical resistance to the deflection measuring device 197. The measured deflection is representative of the amount torque within the respective motor module 24, 30 or 34, i.e., stiction or friction torque. The deflection measuring device 197 converts the measured deflection into electronic energy, e.g., voltage, that is used to generate torque data signals, e.g., voltage or resistance data signals, communicated to the TSACSC 180. The deflection measuring device 197 can communicate the torque data signals to the TSACSC 180 in any suitable manner, for example, via electrical current signals or optical signals.

The TSACSC 180 monitors the torque data signals and determines if the torque within the respective motor module 24, 30 or 34, i.e., stiction or friction torque, is outside of a specified range, due to fouling, jamming or failing of the respective motor module 24, 30 or 34. More particularly, the TSACSC 180 can monitor the torque data signals and if the motor module torque level falls below or rises above a predetermined specified allowable torque range, the TSACSC 180 sends a motor disable command to the ADC 188. In turn, the ADC 188 activates the disengagement actuation device 38 to disengage the roller nut, i.e., roller nut 32 and/or SRN 32A, as described above.

FIG. 13B is a graphical representation 300 of various motor module characteristics monitored by the TSAC during operation of the respective motor module 24, 30 and/or 34. In various embodiments, the TSACSC 180 is configured to analyze the torque within the respective motor module 24, 30 or 23 utilizing only torque signals communicated during specific periods of motor module operation. For example, the TSACSC 180 can analyze the motor module torque using torque signals communicated to the TSACSC 180 during a low frequency zone 304, defined as a specified period of operation before and after a reversing point of the motor module 24, 30 or 34. That is, the TSACSC 180 can monitor the motor module torque for a specific period as rotation of the roller nut 32 or 32A slows down before the reversing point, e.g., 0.5 seconds, and continue to monitor the motor module torque for a specific period after the reversing point, e.g., 0.5 seconds, as the rotation of the roller nut 32 or 32A increases in the opposite direction. Then based on torque data signals monitored during this predetermined specific reversing period of the motor module operation, e.g., 1.0 second, the TSACSC 180 determines if the motor module torque is outside of the predetermined allowable torque range. Therefore, if a motor module 24, 30 and/or 34 fails, e.g., a motor module 24, 30 and/or 34 binds, jams, is contaminated or has excessive wear, improper frictional or stiction torque is detected by the TSAC system 36. In response thereto, the TSAC system 36 commands a disengagement of the SRN 32A.

Still referring to FIG. 13B, in some embodiments the TSACSC 180 receives signals from various sensors (not shown) within the respective motor module 24, 30 or 34 to monitor the torque within the respective motor module 24, 30 or 34, i.e., stiction or friction torque. The TSACSC 180 can utilize the sensor inputs to identify jamming identification signatures such as startup frictional torque, excessive backlash, wearing of the rollers 44, abnormal changes in the torque ripple in a low frequency zone, e.g., the motor module reversing period. For example, the TSACSC 180 can monitor rotational velocity of the roller nut 32 or 32A, current draw of the respective motor module 24, 30 or 24, load torque, i.e., torque generated by forces on the output ram 12, and torque frequency, e.g., torque ripple. The TSACSS 180 would utilize the various sensor signals, determine whether the motor module torque was outside the predetermined allowable torque range, and initiate disengagement of the roller nut 32 or 32A if the motor module torque was determined to be outside the allowable torque range. Additionally, the TSACSC 180 could be programmed to analyze the torque within the respective motor module 24, 30 or 23 using only torque signals communicated during specific periods of motor module operation. For example, the TSACSC 180 can be programmed to analyze the motor module torque using only torque signals communicated to the TSACSC 180 during a specified period of operation before and after a reversing point of the motor module 24, 30 or 34, as described above.

Figure 14:
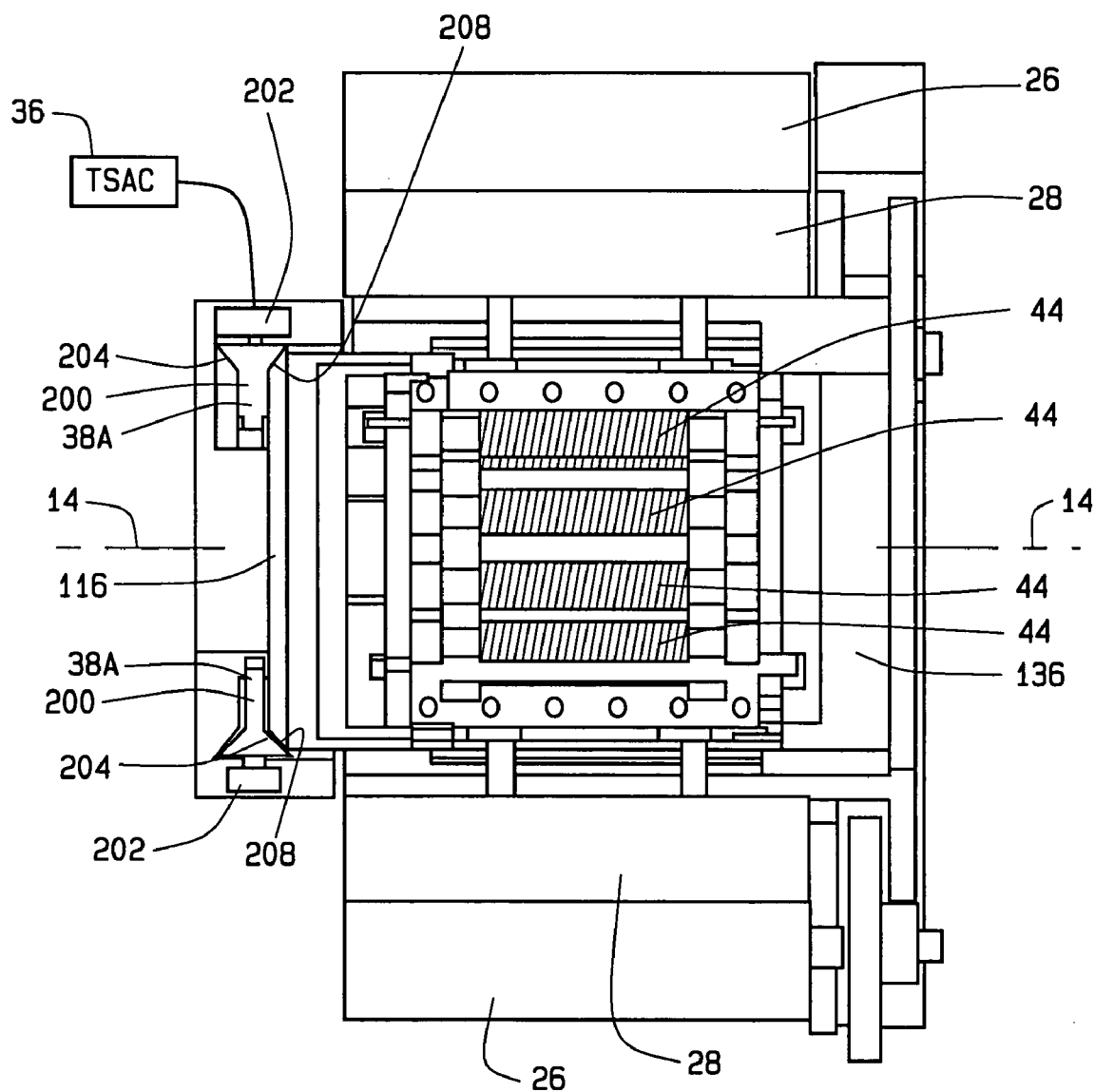
FIG. 14 is a cross-sectional side view of a motor module of the EMA shown in FIG. 1 including the SRN shown in FIG. 9, illustrating a disengagement solenoid device, in accordance with various embodiments.

Referring now to FIG. 14, in various embodiments, the disengagement actuation device 38 comprises a disengagement solenoid device 38A having a plunger 200. When the TSACSC 180 interprets the torque data from the TSC 178 to indicate that improper torque, e.g., torque outside a predetermined allowable range, is being generated in the respective motor module 24, 30 or 34, the TSC 178 sends the disengagement command to the ADC 188. The ADC 188 excites a solenoid coil 202 to generate a magnetic field that causes the solenoid plunger 200 to extend. The solenoid plunger 200 is effectively in contact with the SRN disengagement cam 116 such that as the solenoid plunger 200 extends the SRN disengagement cam 116 is moved toward the retaining cap 156. Accordingly, the SRN disengagement cam 116 moves the retaining cage 170 to disengage the rollers 44 as described above. Although FIG. 14 illustrated the disengagement solenoid device 38A operative with the SRN disengagement cam 116, and described herein with respect to the SRN disengagement cam 116, it should be understood that the disengagement solenoid 38A is also operable with the disengagement cam 40 described above with respect to FIGS. 4, 4A and 4B.

In some embodiments, the disengagement solenoid device 38A is located within the respective motor module 24, 30 or 34 substantially collinear with a radius of the SRN 32A. Additionally, the solenoid plunger 200 includes a beveled surface 204 that is adjacent and substantially mates with a beveled surface 208 of the SRN disengaging cam 116. When the TSACSC 180 interprets the torque data from the TSC 178 to indicate that improper torque is being generated in the respective motor module 24, 30 or 34, the TSC 178 sends the disengagement command to the ADC 188. The ADC 188 excites the solenoid coil 202 to generate the magnetic field that causes the solenoid plunger 200 to move, or extend, radially inward toward the axis 14. As the solenoid plunger 200 extends radially inward, the plunger beveled surface 204 interacts with the cam beveled surface 208 causing the SRN disengagement cam 116 to disengage the SRN 32A as described above.

Figure 15:
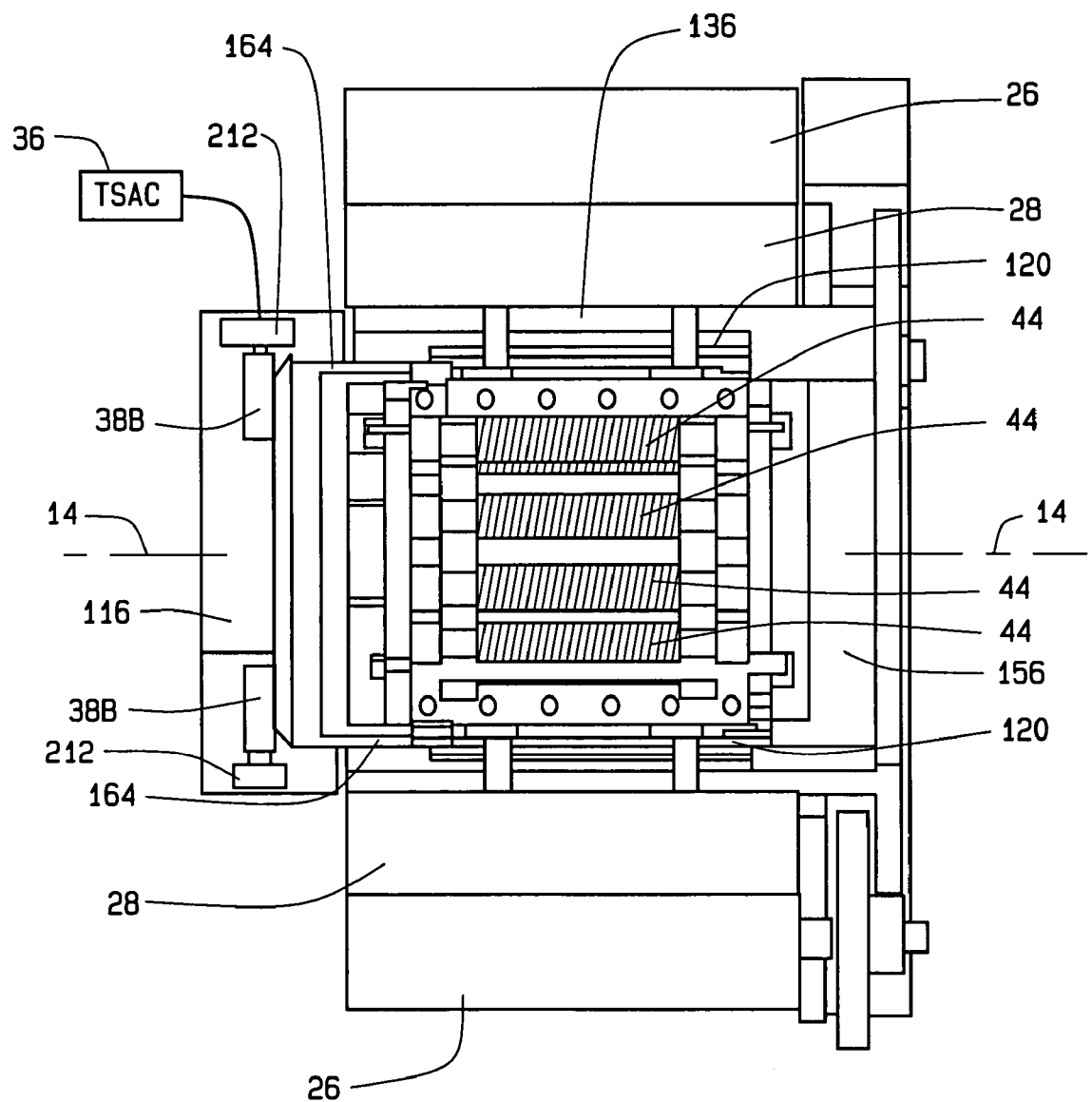
FIG. 15 is a cross-sectional sections view of the motor module of the EMA shown in FIG. 1 including the SRN shown in FIG. 9, illustrating a disengagement piezo device, in accordance with various embodiments.

Referring now to FIG. 15, in various embodiments, the disengagement actuation device 38 comprises a micro-actuator based disengagement device 38B. When the TSACSC 180 interprets the torque data from the TSC 178 to indicate that improper torque is being generated in the respective motor module 24, 30 or 34, the TSC 178 sends the disengagement command to the ADC 188. The ADC 188 excites a micro-actuator coil 212 to generate an electrical field that causes the micro-actuator based disengagement device 38B to deflect or extend. The micro-actuator based disengagement device 38B is effectively in contact with the SRN disengagement cam 116 such that as the micro-actuator based disengagement device 38B deflects or extends the SRN disengagement cam 116 is moved toward the retaining cap 156. Accordingly, the SRN disengagement cam 116 moves the retaining cage 170 to disengage the rollers 44 as described above. Although FIG. 14 illustrated the micro-actuator based disengagement device 38B operative with the SRN disengagement cam 116, and described herein with respect to the SRN disengagement cam 116, it should be understood that the micro-actuator based disengagement device 38B is also operable with the disengagement cam 40 described above with respect to FIGS. 4, 4A and 4B. In some embodiments, the micro-actuator based disengagement device 38B comprises a piezo electric device.

Figure 16:
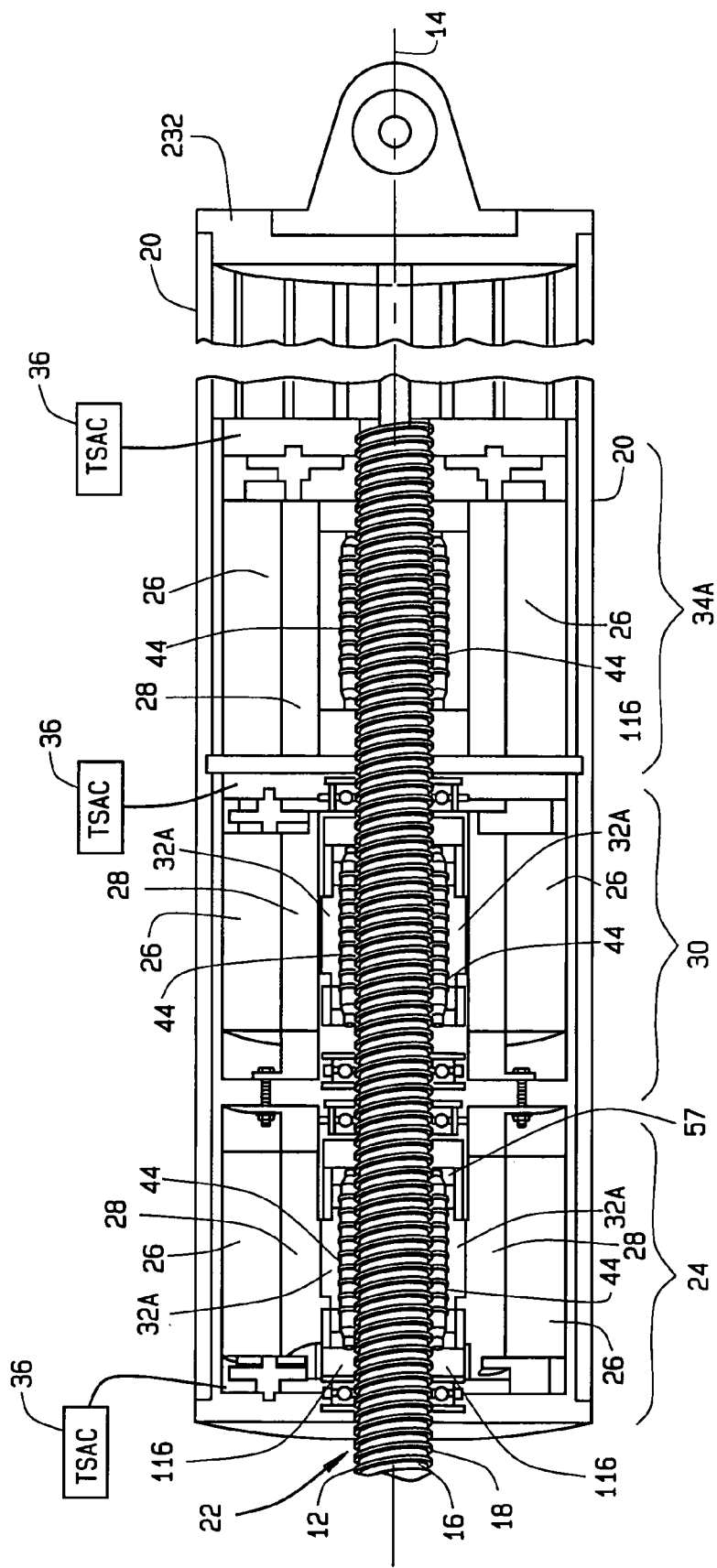
FIG. 16 a cross-sectional view of an EMA having a non-disengageable motor module, in accordance with various embodiments of the disclosure.
Figure 17:
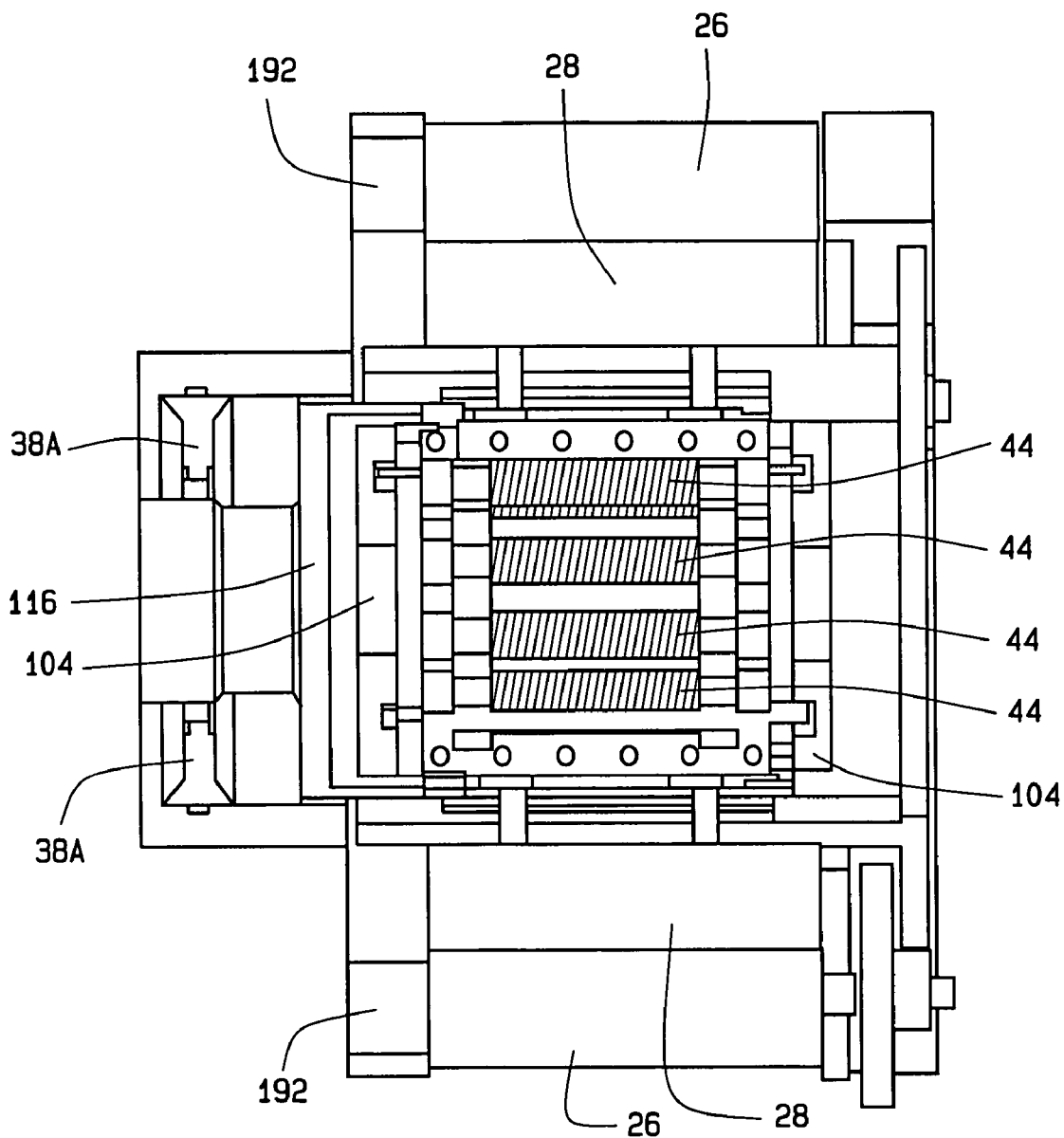
FIG. 17 is a cross-sectional side view of the motor module shown in FIG. 14 including the torque sensing wheel shown in FIG. 13, in accordance with various embodiments.

Referring to FIG. 16, in various embodiments the EMA 10 includes the first motor module 24 and the second motor module 30, wherein the roller nuts, e.g., roller nut 32 or SRN 32A, of the first and second motor modules 24 and 30 are engaged with the output ram 12. The EMA 10 further includes a third non-disengageable motor module 34A wherein the rollers 44 can not be disengaged from the output ram 12. However, only the first motor module 24 is provided power to drive the output ram 12. The second and third motor modules 30 and 34A 'free-wheel', i.e., are not activated, and provide no motive force to extend or retract the output ram 12. The roller nut, e.g., 32 or 32A, of the first motor module 24 is designed to have approximately zero axial backlash when carrying load and active with the output ram 12. That is, the fabrication, or manufacturing, tolerances of the first motor module 24 are specified so that there is approximately zero backlash when driving the output ram 12. For example, the roller nuts 32 or 32A of the first motor module 24 can be designed and fabricated so that a tolerance stack between threads of the rollers 44 and the output ram threads 18 allows for approximately zero 'play' between the mating threads, i.e., approximately zero backlash.

However, the second motor module 30 is designed to allow a certain amount of axial backlash when carrying load and active with the output ram 12. That is, the fabrication, or manufacturing tolerances of the second motor module 30 are specified such that when driving the output ram 12 the second motor module 30 will have axial backlash within a predefined first allowable range. Further, the third motor module 34A is designed to allow a certain amount of axial backlash that is greater than the amount allowed within the second motor module 30 when carrying load and active with the output ram 12. That is, the fabrication, or manufacturing, tolerances of the third motor module 34A are specified such that when driving the output ram 12, the third motor module 34A will have axial backlash within a predefined second allowable range that is broader than the predefined first allowable range of the second motor module 30. Having the fabrication tolerances vary between each of the motor modules 24, 30 and 34 prevents force-fighting between the engaged motor modules 24, 30 and 34 that could cause the output ram 12 to lock up, jam or not operating smoothly.

In these embodiments, the roller nut 32 or 32A of the first motor module 24 is initially carrying one hundred percent of the load, while the roller nuts of the second and third motor modules 30 and 34A are carrying no load. The TSAC system 36 of the first motor module 24 is programmed to disengage the respective roller nut 32 or 32A when the TSAC system 36 determines that the torque within the first motor module 24 is outside of a predetermined torque range, as described above. When the first motor module 24 is disengaged, the second motor module 30 is activated to provide motive force to extend and retract the output ram 12, whereby the second motor module 30 carries one hundred percent of the load. During this time, the EMA 10 will exhibit some backlash during operation, but will continue to operate. As described above, the TSAC system 36 of the second motor module 30 is also programmed to disengage the respective roller nut when the TSAC system 36 determines that the torque within the second motor module 30 is outside of a predetermined torque range. When the second motor module 30 is disengaged, the third motor module 34A is activated to provide motive force to extend and retract the output ram 12. Accordingly, the third motor module 34A carries one hundred percent of the load and can not be disengaged from the output ram 12. During this time, the EMA will exhibit more backlash during operation than when the second motor module 30 was driving the output ram 12, but will continue to operate.

In various embodiments, the TSAC system 36 of the first motor module 24 is programmed to disengage the respective roller nut when the TSAC system 36 determines that the torque within the first motor module is outside of a first predetermined torque range. Additionally, the TSAC system 36 of the second motor module 30 is programmed to disengage the respective roller nut when the TSAC system 36 determines that the torque within the second motor module 30 is outside of a second predetermined torque range that is broader than the first torque range of the first motor module 24.

In various other embodiments, the actuator 10 includes only the disengageable first motor module 24 and the non-disengageable third motor module 34A. In such embodiments, the fabrication tolerances of the first motor module 24 are specified so that there is approximately zero backlash when driving the output ram 12. Additionally, the tolerances of the third motor module 34A are specified such that when driving the output ram 12, the third motor module 34A will have axial backlash within a predefined allowable range.

Figure 18:
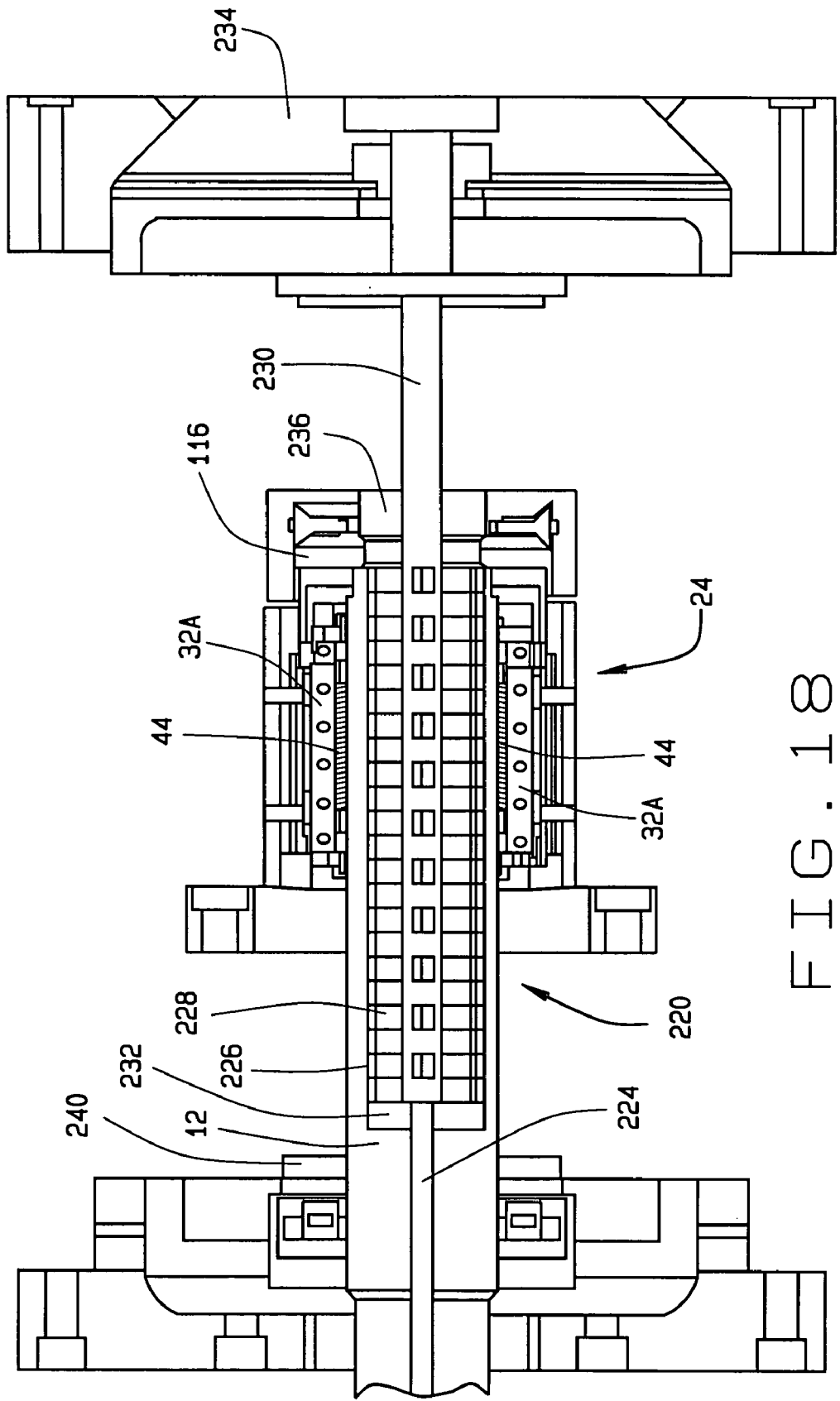
FIG. 18 is a cross-sectional side view of the EMA shown in FIG. 1 including a back drive braking mechanism, in accordance with various embodiments.
Figure 19:
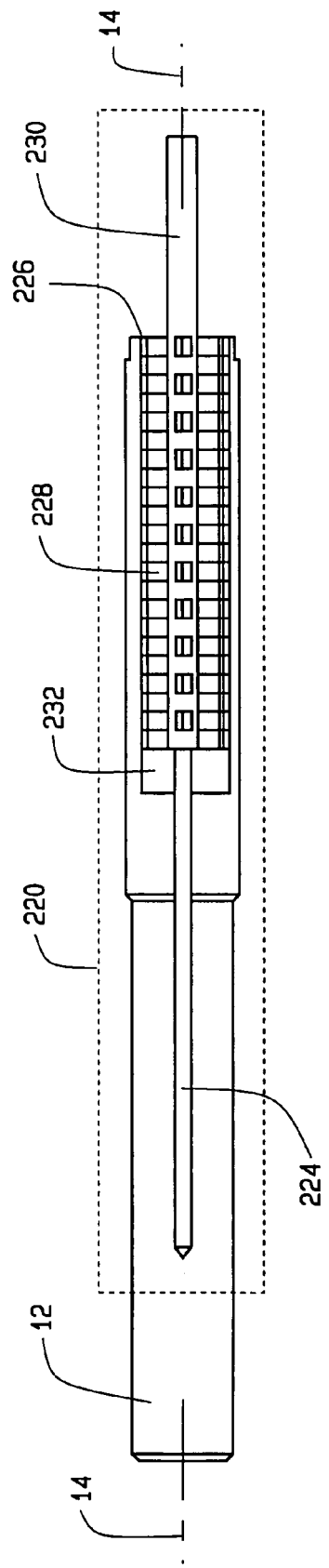
FIG. 19 is a side partial cross-sectional view of a linear motor included in the back drive braking mechanism shown in FIG. 18.

Referring now to FIGS. 12, 18 and 19, as described above, the EMA 10 includes one or more motor modules 24, 30 and/or 34 wherein the disengagement and/or engagement of the roller nut 32 or 32A with the output ram 12 is controlled by the TSAC system(s) 36. Also described above, in various embodiments, the TSAC system(s) 36 of each motor module(s) 24, 30 and/or 34 included in the EMA 10 are configured to disengage the respective roller nut 32 or 32A if the motor module torque is determined to be outside the predetermined allowable range. In such embodiments, if the torque within the motor module 24, 30 or 34 actively driving the output ram 12 is determined to be improper, i.e., outside the allowable range, and there is not another redundant, or backup, motor module 24, 30 or 34 to assume control of the output ram 12, the respective TSAC system 36 would disengage the respective roller nut 32 or 32A, leaving the output ram to 'free-float', i.e., move in an uncontrolled manner. Thus, the mechanical component or device, e.g., an aircraft control surface, connected to and controlled the output ram 12 would also be able to free-float, which could present unwanted, hazardous, or catastrophic results. In various embodiments, the EMA includes a back drive braking mechanism 220 adapted to move the output ram 12 to a neutral position and hold the output ram 12 in the neutral position if a free-float condition should occur. Accordingly, the mechanical component or device connected to the output ram 12 would also be moved to and held in a desired neutral position. For simplicity and clarity, FIG. 18 illustrates the EMA 10 including only a single motor module 24, however, it should be understood that the EMA 10 shown in FIG. 18 could also include one or more redundant motor modules 30 and/or 34. Additionally, although the motor module 24 is not shown coupled within the EMA housing 20, it should be understood that the motor module 24 is coupled within the EMA housing and can not move longitudinally along the axis 14. Therefore, when the motor module 24 is operating to drive the output ram 12, the output ram 12 will be longitudinally moved, i.e., extended or retracted, along the axis 14.

The back drive braking mechanism 220 includes a linear position transducer 224 and a linear motor 226 integrated within an internal portion, e.g., an internal cavity, of the EMA output ram 12. Although the linear motor 226 will be described herein as a permanent magnet motor, the linear motor 226 can be any suitable linear motor, for example, a piezoelectric linear motor. The linear motor 226 includes a plurality windings 228 that surround a linear motor drive rod 230. The windings 228 are coupled to the output ram 12 within the internal cavity and the drive rod 230 is coupled at a proximal end to an end cap 234 of the EMA 10. When the windings 228 are energized, a controllable magnetic field is generated that exerts a controllable linear force on the drive rod 230 along the axis 14. Thus, since the drive rod 230 is connected to the EMA end cap 234, such a linear force will cause the windings 228, and accordingly the connected output ram 12, to move, i.e., extend or retract, along the axis 14. The linear position transducer 224 is connected to a distal end of the drive rod 230 and communicates with a linear motor controller 232 to provide positional feedback data identifying the longitudinal position of the output ram 12 along the axis 14.

When the TSACSC 180 of the motor module 24 determines that the torque within motor module 24, i.e., stiction or friction torque, is outside the allowable motor module torque range, the TSACSC 180 sends a disengagement signal to the ADC 188 to disengage the roller nut 32 or 32A. Substantially simultaneously, the TSACSC 180 sends an activation command signal to a linear motor controller 232. In response to the activation command signal, the linear motor controller 232 energizes the linear motor windings 228 to move the windings 228 along the drive rod 230 and thereby move the output ram 12 and connected mechanical component or device. The linear motor controller 232 communicates with the linear position transition 224 to move the drive rod 230 and output ram 12 to a predetermined desirable neutral position. Thus, substantially simultaneously, the roller nut 32 or 32A of the motor module 24 disengages from the output ram 12 and the linear motor 226 is energized, thereby allowing the output ram 12 to freely move under the control of the linear motor 226 to the desired neutral position. In various embodiments, the linear motor 226 includes an electronic brake 236 controlled by the linear motor controller 232 to hold the output ram 12 in the desired neutral position until the motor module 24, or the actuator 10, can be repaired or replaced. Alternatively, the actuator 10 can include an electrical or a mechanical brake 240 within the housing 20 and external to the back drive braking mechanism 220 to hold the output ram 12 in the desired neutral position until the motor module 24 or the actuator 10 can be repaired or replaced.

The ease with which the output ram 12 direction and speed can be changed are some of the significant advantages that the actuator 10 has over prior art hydraulic actuators. Fault-tolerance, and hence reliability, of the actuator 10 is achieved by having multiple motor modules 24, 30 and/or 34 able to drive the output ram 12, such that if a motor module 24, 30 or 34 fails, the failed motor module 24, 30 or 34 can be disengaged and one or more redundant motor module 24, 30 and/or 34 employed to substantially seamlessly assume the load. Thus, by providing two or more motor modules 24, 30 and/or 30 fixed within the housing 20, each of which is engageable with the helically threaded output ram 12, the electrically powered, fault-tolerant linear actuator 10 can be realized.

What is claimed is:

1. An electromechanical actuator comprising:
   at least one motor module engageable with an output ram for controllably translating the output ram along a linear axis of the output ram; and
   an electronic torque sensing adaptive control (TSAC) system for electronically monitoring motor module torque within the motor module and generating a disengagement command signal to initiate disengagement of the motor module from the output ram when the torque within the motor module is outside or above an allowable motor module torque range; wherein the TSAC system includes a torque sensing circuit for sensing operating parameters of the motor module; and wherein motor module comprises a segmented roller nut engageable with the output ram, the segmented roller nut including a plurality of separable sections retained together by a pair of C-ring biasing devices.

2. An electromechanical actuator comprising:
   a threaded output ram connectable to a mechanical component;
   at least one motor module for controllably translating the output ram along a linear axis of the output ram to impart movement to the mechanical component; and
   a torque sensing adaptive control (TSAC) system for monitoring torque within the motor module and determining whether the motor module torque is outside an allowable motor module torque range;
   wherein the motor module comprises:
     a roller nut having a plurality of threaded rollers engageable with the threaded output ram;
     a disengaging cam for disengaging the threaded rollers from the threaded shaft; and
     a disengagement actuation device for causing the disengaging cam to disengage the threaded rollers from the threaded shaft when the TSAC system determines the motor module torque is outside the allowable motor module torque range.

3. The actuator of claim 2, wherein the actuation device comprises a solenoid disengagement device activated by the disengage command signal to move the disengaging cam along the axis of the output ram to disengage the rollers from the output ram.

4. The actuator of claim 2, wherein the actuation device comprises a micro-actuator disengagement device activated by the disengage command signal to move the disengaging cam along the axis of the output ram to disengage the rollers from the output ram.

5. The actuator of claim 4, wherein the micro-actuator disengagement device comprises a piezo-electric device.

6. The actuator of claim 2, wherein the TSAC system includes a torque sensing circuit for sensing operating parameters of the motor module, the operating parameters including at least one of a motor module drive current, a linear position of the output ram along a longitudinal axis of the output ram, a rotational velocity of the roller nut and a voltage applied to the motor module.

7. The actuator of claim 6, wherein the TSAC system further includes a controller communicatively connected to the torque sensing circuit for analyzing the torque within the motor module and determining when the motor module torque is outside the allowable motor module torque range based on the motor module operating parameters sensed by the torque sensing circuit.

8. The actuator of claim 7, wherein the TSAC controller is adapted to analyze the torque within the motor module during a low frequency zone of motor module operation.

9. The actuator of claim 7, wherein the TSAC system further includes an actuator drive circuit communicatively connected to the TSAC controller, for activating the disengagement actuation device upon receiving a motor disable command generated by the TSAC controller when the TSAC controller determines the motor module torque is outside the allowable motor module torque range.

10. The actuator of claim 7, wherein the TSAC system further includes an electronic storage device for storing at least one torque monitoring algorithm executable by the TSAC controller to determine whether the motor module torque is outside the allowable motor module torque range based on the motor module operating parameters sensed by the torque sensing circuit.

11. The actuator of claim 2, wherein the roller nut comprises a segmented roller nut including a plurality of separable sections retained together by a pair of C-ring biasing devices.

12. The actuator of claim 2, wherein the actuator comprises:
   a plurality of motor modules engageable with the output ram for controllably moving the output ram along a linear axis of the output ram; and
   at least one TSAC system for monitoring torque within the motor modules and generating the disengagement command signal to initiate disengagement of any of the motor modules from the output ram when the TSAC system determines torque within the respective motor module is outside an allowable motor module torque range.

13. A mobile platform comprising:
   a mechanical component coupled to a threaded output ram of an electromechanical actuator (EMA) such that movement of the mechanical component is controlled by linear translation of the output ram, wherein the EMA comprises:
      at least one motor module for controllably translating the output ram along a linear axis of the output ram to impart movement to the mechanical component; and
      an electronic torque sensing adaptive control (TSAC) system for electronically monitoring torque within the motor module and determining whether the motor module torque is outside an allowable motor module torque range;
      wherein the motor module comprises:
         a roller nut having a plurality of threaded rollers engageable with the threaded output ram;
         a disengaging cam for disengaging the threaded rollers from the threaded shaft; and
         a disengagement actuation device for causing the disengaging cam to disengage the threaded rollers from the threaded shaft when the TSAC system determines the motor module torque is outside the allowable motor module torque range.

* * * * *